United States Patent

Dimmick et al.

[11] 3,967,072
[45] June 29, 1976

[54] TIME DIVISION NETWORK CONNECTION AUDITING ARRANGEMENT

[75] Inventors: James Owen Dimmick; Theras Gordon Lewis; John Francis O'Neill, all of Boulder, Colo.; Lucian Philip Fabiano, Jr., Madrid, Spain

[73] Assignee: Bell Telephone Laboratories, Incorporated, Murray Hill, N.J.

[22] Filed: June 10, 1974

[21] Appl. No.: 478,147

Related U.S. Application Data

[63] Continuation-in-part of Ser. No. 313,956, Dec. 11, 1972, abandoned.

[52] U.S. Cl. .......................... 179/18 J; 179/15 AQ; 179/18 ES
[51] Int. Cl.[2] ..................... H04M 3/20; H04Q 1/52
[58] Field of Search ........ 179/15 A, 15 AQ, 15 AT, 179/18 ES, 18 GF, 18 J, 99

[56] References Cited
UNITED STATES PATENTS

| | | |
|---|---|---|
| 3,271,521 | 9/1966 | Von Sanden et al. .......... 179/15 AT |
| 3,305,641 | 2/1967 | Von Sanden et al. .......... 179/15 AT |
| 3,347,992 | 10/1967 | Von Sanden et al. .......... 179/15 AT |
| 3,647,980 | 3/1972 | Fabiano et al. ................. 179/18 ES |
| 3,652,804 | 3/1972 | Comella .......................... 179/18 ES |

*Primary Examiner*—R. Stephen Dildine, Jr.
*Attorney, Agent, or Firm*—H. R. Popper

[57] ABSTRACT

An electronic key telephone system is disclosed in which connections among the station sets and telephone lines are made in a central time division switching network remote from the station sets. Each station set and line is equipped with a port circuit having an individual shift register for defining the time slot interval during which a connection may take place. To assign a time slot to a port circuit, the main controller interrogates the network to find an idle time slot and then furnishes that time slot number to the network controller. In order to save central memory and to increase system reliability, the main activity memory which stores an indication of which ports are or should be interconnected in the network need not contain any reference to the time slot number assigned for the particular connection. In order periodically to verify that actual network connections reflect the state of the activity memory, two types of audits are performed. A fast audit accesses the activity memory to find an active port and then accesses the network to find the time slot assigned the port. If no time slot or more than one time slot are assigned, an error indication results. A slow audit is performed which steps through all idle port circuits and which clears network connections for ports whose activity memory indicates an idle state but for which a network time slot is found.

10 Claims, 32 Drawing Figures

FIG. 14C

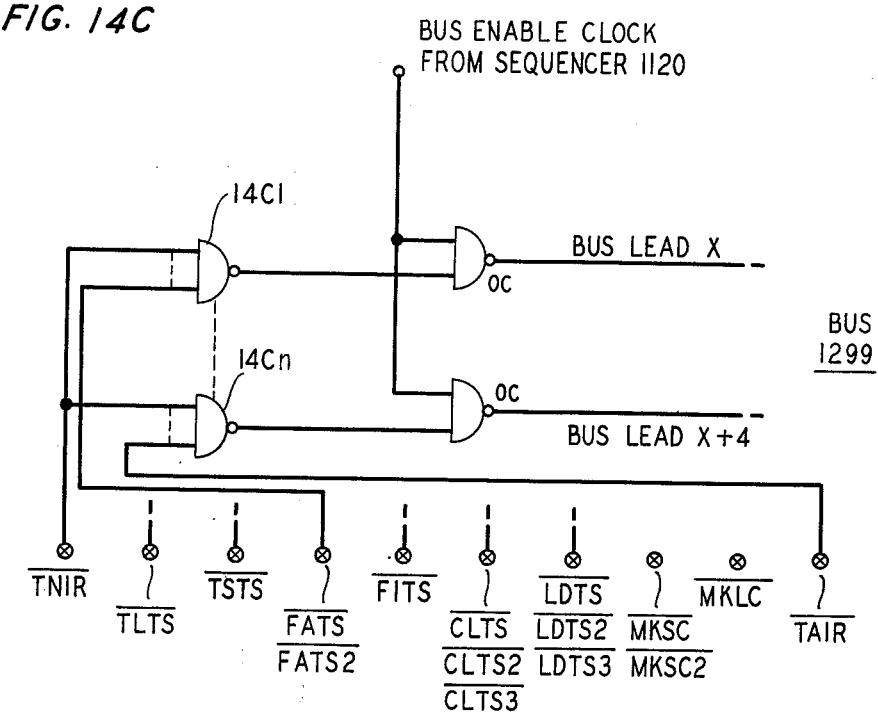

| CODE | FUNCTION |
|---|---|
| TNIR | TRANSFER STATION AND LINE NUMBERS INTO NETWORK INTERFACE REGISTER (NIFR) 500 |
| TLTS | TRANSFER LINE TIME SLOT FROM NIFR TO STATION NUMBER BYTE OF STATION ACTIVITY REGISTER IN MAIN CONTROLLER |
| TSTS | TRANSFER STATION TIME SLOT FROM NIFR TO STATION-IN-CONTROL BYTE OF LINE ACTIVITY REGISTER IN MAIN CONTROLLER |
| FATS | FIND ACTIVE TIME SLOT COMMAND TO NETWORK |
| FITS | FIND IDLE TIME SLOT COMMAND TO NETWORK |
| CLTS | CLEAR TS OF DECODED STATION OR LINE COMMAND TO NETWORK |
| LDTS | LOAD TS STORED IN NIFR INTO DECODED STATION OR LINE COMMAND TO NETWORK |
| MKSC | MARK (DECODE) STATION CIRCUIT STORED IN NIFR |
| MKLC | MARK (DECODE) TIME CIRCUIT STORED IN NIFR |
| TAIR | TRANSFER SLOW AUDIT NUMBER FROM LSSAC TO NIFR |

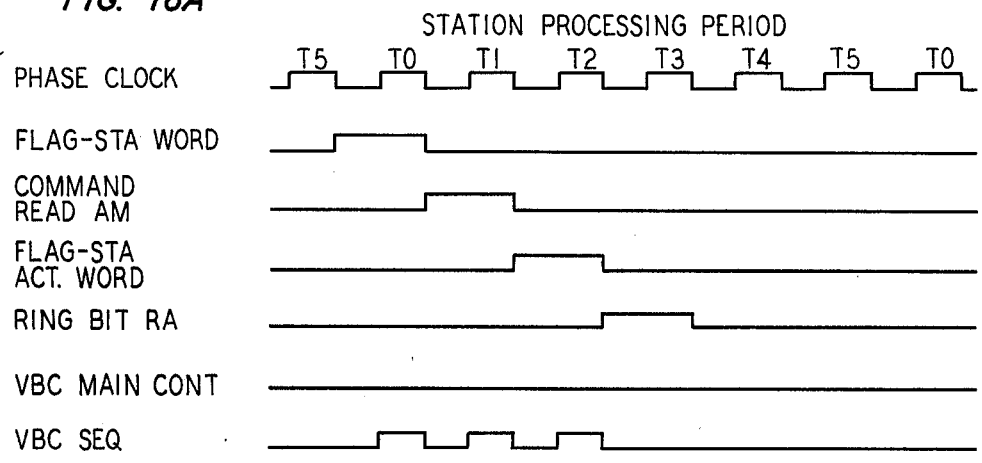
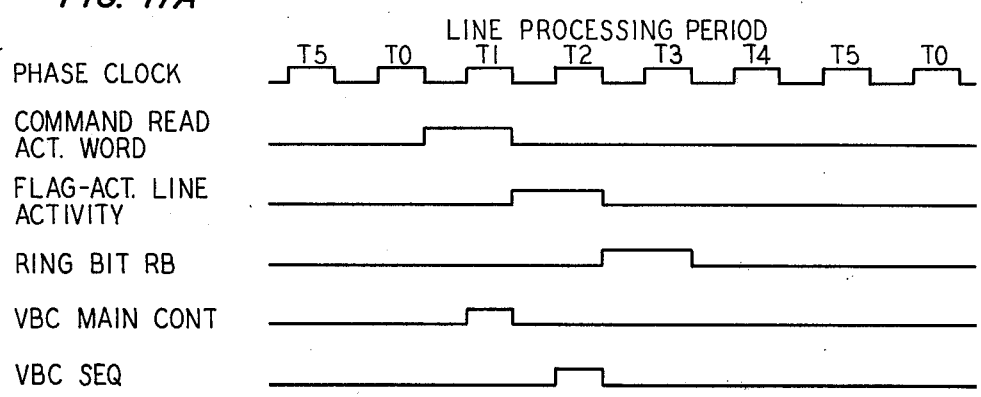
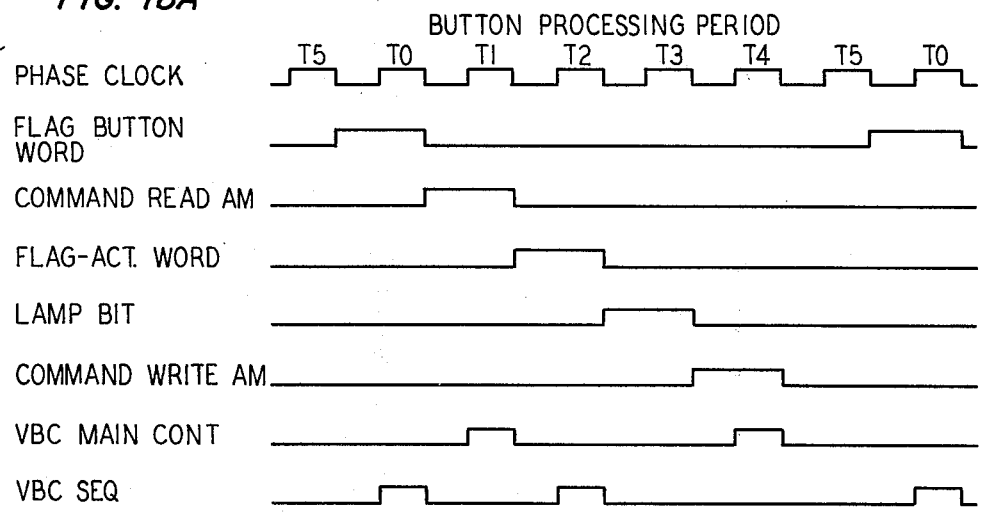

*FIG. 19*

| FIG. 1 | FIG. 7 |
|---|---|
| FIG. 2 | FIG. 8 |
| FIG. 3 | FIG. 9 |
| FIG. 4 | |

| FIG. 11 | FIG. 5 | |
|---|---|---|
| FIG. 12 | FIG. 6 | FIG. 10 |

3,967,072

TIME DIVISION NETWORK CONNECTION AUDITING ARRANGEMENT

CROSS REFERENCE TO RELATED APPLICATION

This application is a continuation-in-part of Ser. No. 313,956 filed Dec. 11, 1972 and now abandoned.

BACKGROUND OF THE INVENTION

This invention relates to telephone switching systems and more particularly to small electronically controlled switching networks for providing private branch exchange or centralized switching service for electronic key telephone sets.

In the evolution of telephone switching systems, there is now known a type of key system in which only a fixed minimum number of wires need be cabled out to the key telephone set regardless of the number of line pick-up keys with which the set is equipped. This reduction in amount of key set cabling has been made possible by dedicating a pair of wires in the cable to the performance of speech path communication and by recognizing that the control functions, such as transmitting lamp or ringer control signals, operated key button identity and/or call signaling information can be transmitted as data signals over but two other pairs of wires. The operated keybutton identity transmitted over the data link conductor may be employed to control a local switching network to connect the "tip and ring" of the telephone set with the "tip and ring" of the designated line.

The reduction in cabling and the use of data links necessitates that a central or main control unit be provided which, in association with the local switching network, provides the controlling signals for the establishment of the requisite network connections and the transmission to the station sets of the needed control impulses.

The type of switching network which suitably may be employed in providing the centralized switching function for such an electronic telephone system may either be of the space division type as described in L. P. Fabiano U.S. Pat. No. 3,637,939 issued Jan. 25, 1972 or may be of the time division variety. Aspects of an illustrative time division key telephone system are disclosed in D. G. Medill U.S. Pat. No. 3,789,154 issued Jan. 29, 1974; D. G. Medill-J. F. O'Neill U.S. Pat. No. 3,789,152 issued Jan. 29, 1974; and T. G. Lewis U.S. Pat. No. 3,787,631 issued Jan. 22, 1974.

In a time division switching system a frame containing a fixed number of time slots is allocated for use in establishing connections among the station sets or between station sets and central office lines or trunks. The number of time slots determines the number of simultaneous conversations that can take place in the network.

Heretofore there has been some reluctance to employ time division techniques in small switching installations because the systems tend to be rather more expensive to install than space division system. One of the items that has contributed to the expense of time division systems is the need to store in the memory unit associated with the central control information identifying the number of the network time slot assigned to a connection. The storage of a time slot number for a system having a frame of 128 time slot number requires that six bits be provided in the central memory unit for each line, station and trunk having an appearance in the switching network.

Another deterrent to the use of coventional control techniques for time division switching has been that the use of a central time slot assignment memory "map" occasionally introduces a degree of system unreliability. For example, a particular line and station may be assigned a given time slot number so that they may be interconnected by the time division communications bus. The time slot number so assigned usually will, in any well-constructed system, result in that line and station being interconnected during the specified interval. The time slots themselves are defined by a clock and by a counter controlled by the clock. To assign a particular time slot to a line and station in prior art systems the count accruing in the counter during any specified count is entered into a register and the contents of this register are eventually transferred to the central memory where they are stored in the time slot bytes of the line and station activity memory words. The memory elements storing the identities of the line and station and of the time slot thereunto assigned, as well as the register for entering the time slot count accruing in the counter, may typically be constructed of magnetic core elements or of elements employing solid state technology. Both magnetic core and solid state devices are usually quite reliable although each is subject to its particular form of interference. If a stray noise spike is introduced into the system it may, on occasion, inadvertently advance the counter or a memory element may fail to read out properly. If the counter loses synchronism with the clock defining the network time slots actually assigned, a disagreement will result between the actual state of the network and the representation of that state which is reported back to the central control equipment for the switching network. The disagreement between the information stored for the connection in the network map and the connection status reported from the network itself could result in the central control initiating operations to reset the network connections even though the connections themselves are correctly established.

Accordingly, it is an object of the present invention to provide a small time division switching network which dispenses with the need for a centralized memory network map and which is reliable and sufficiently economical for use in small key telephone and private branch exchange installations.

SUMMARY OF THE INVENTION

In accordance with our invention, a time division switching system for a small electronic key telephone system is provided in which no centralized record need be kept of the time slot number assigned for the network interconnection of line and station port circuits. The central memory records only the identity of the lines and stations between which network connections are desired. In order to ensure that the network reflects the status of the activity memory two types of network audit are performed. A fast network audit is performed each time a port circuit is processed which is indicated by the activity memory as having an established network connection. The network is then accessed to ascertain the actual time slot number assigned this port circuit and also to ascertain the time slot number assigned to the other port circuit which the activity memory indicates should be connected by the network to the first port circuit.

In accordance with one aspect of the illustrative embodiment each port circuit in the network is equipped with a time slot defining port circuit shift register that may be selectively coupled to a common time slot reporting bus. The bus is monitored during a cycle of time slots to assure that the port is assigned an active network connection during only one time slot. If more or less than one time slot is assigned to a port, the time slot is declared invalid and a new time slot is assigned. After the time slot is determined to be valid, or corrected when invalid, the next port circuit indicated by the activity memory as having an established network connection is audited. In this manner, the validity of time slots assigned the active network ports is rapidly ascertained.

In addition to the foregoing fast audit of active connections, a slow audit of all line and station port circuits is conducted. The number of a predetermined port circuit is recorded in a slow audit register and when, during the processing of all stations, this number is detected as the number of the station being processed, the activity memory is accessed to determine whether that port is active or idle. If the port is indicated as being idle, the network is instructed to disconnect the port. The next sequential port number is selected for auditing during the next processing of stations. In this manner a sequential check of all ports in the system is conducted, one port being selected during a complete cycle of processing.

BRIEF DESCRIPTION OF THE DRAWING

The foregoing and other features of our invention may become more apparent by referring now to the drawing in which:

FIGS. 13A, 14A, 14B and 14C show that portion of the detailed circuitry of memory update and network control 1280 which implements the fast audit process of the present invention;

FIGS. 16A, 17A and 18A show the timing waveforms present during the station, line and button processing periods, respectively;

FIG. 19 shows how FIGS. 1-11 are to be arranged.

GENERAL SYSTEM DESCRIPTION

Figure 1:
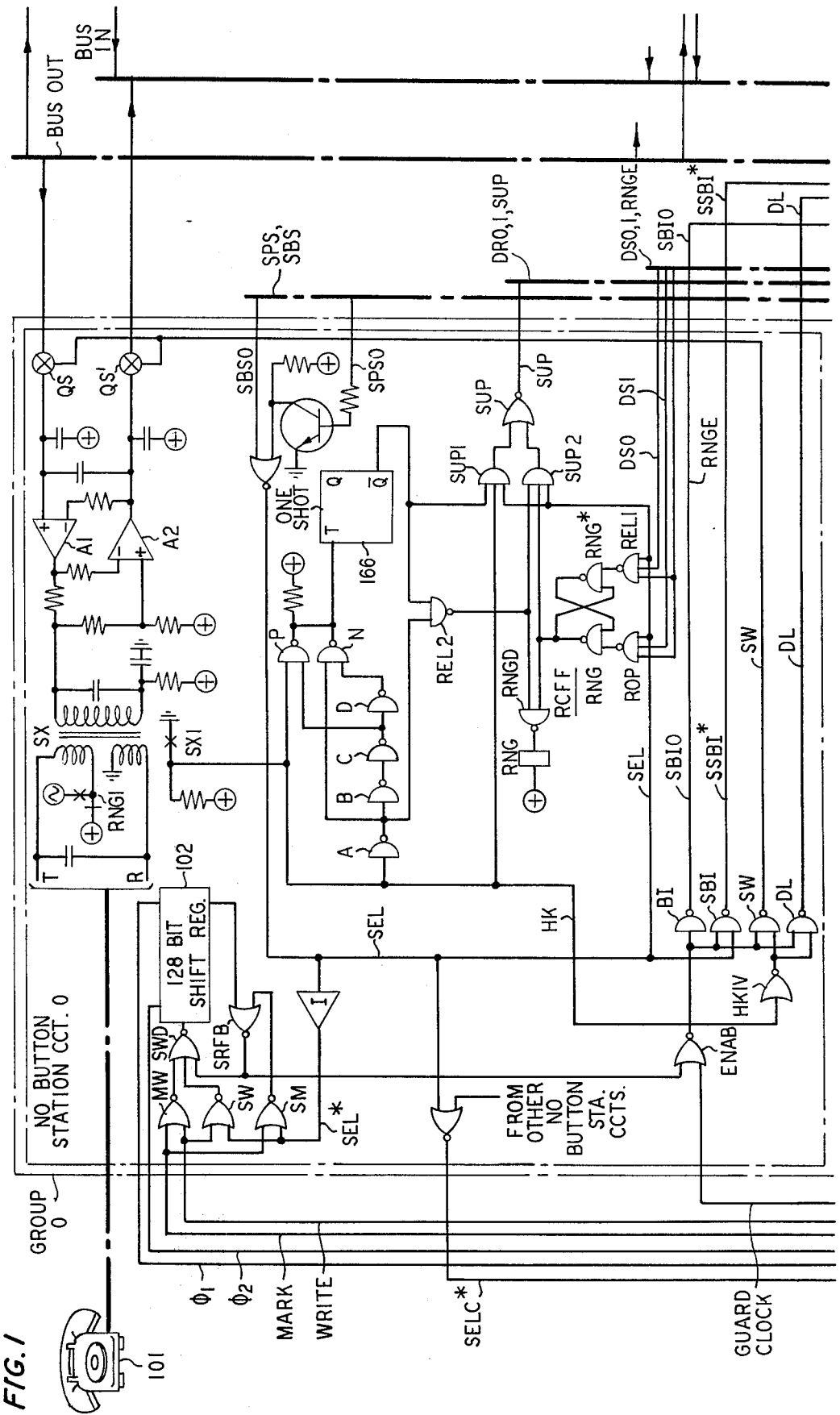
FIG. 1 shows a station port circuit for serving a conventional "no-button" telephone set.

The electronic key telephone system in which the present invention may be employed includes a plurality of electronic key telephone stations 203, 263 FIG. 2 and 400, 463 FIG. 4. Each of the electronic key telephone sets is connected to a station port circuit which is part of the centralized key telephone system equipment serving all of the key telephone sets belonging to a telephone customer or to a group of key telephone customers in a given location such as a small building or one or more floors of a large building. Each of the conventional non-key telephone sets 101, FIG. 1 served by the system is connected to a station port circuit for "no-button" sets which circuit communicates with the main controller FIG. 12 via sequencer 1120, FIG. 11 in the same fashion as port circuits for the electronic telephone sets. Typically, the electronic key system described herein may serve up to approximately 512 lines or trunks for a total of 1,024 interconnectable ports.

In the ensuing description, the station, line, and trunk circuits having appearances in the switching network will from time to time be referred to as ports. The interconnection of ports is accomplished by time division switching, each port being equipped with a recirculating shift register having a single bit for defining the time slot during which interconnection to that port can be made in the system. A pair of time division buses respectively designated IN bus and OUT bus are employed, signals on the bus being summed in a summer amplifier Σ, FIG. 4, and applied to the OUT bus.

Unlike time division switching systems designed for central offices use or for conventional private branch exchange service use, time slots on the IN bus and OUT bus may be assigned to any number of ports so that functionally any number of ports belonging to lines or stations may be interconnected at the same time. This feature is provided to permit more than one station simultaneously to "pick up" the same line and thereby permits both bridging and conferencing. Each port circuit is equipped with a respective switch for connecting the port to the IN bus and the OUT bus and the switches are simultaneously controlled by the output of the port circuit's shift register.

The port circuits, such as the station port circuits of FIGS. 1–4, are arranged in groups of 64. Each group of port circuits is served by a "center board circuit", FIG. 3, which is provided for receiving an address signal from the network controller designating the group of port circuits and for decoding relative address signals to select the particular port circuit in the group. A center board circuit may also serve port circuits within a group that accommodate conventional telephone sets. In this case the center board circuit allows the main controller to communicate with these port circuits, in the same manner that it does with port circuits serving the electronic telephone sets of the system.

The port circuits serving stations receive station control data from the central control sequencer (FIG. 11) over buses DSO,1 and RNGE, and return data over buses DRO,1. Each group of 64 port circuits serving stations reports the busy/idle states of its respective stations over a distinctively numbered station busy/idle bus SBI-. In addition, a common selected busy-idle bus SSBI serves all of the station circuits.

Figure 5:
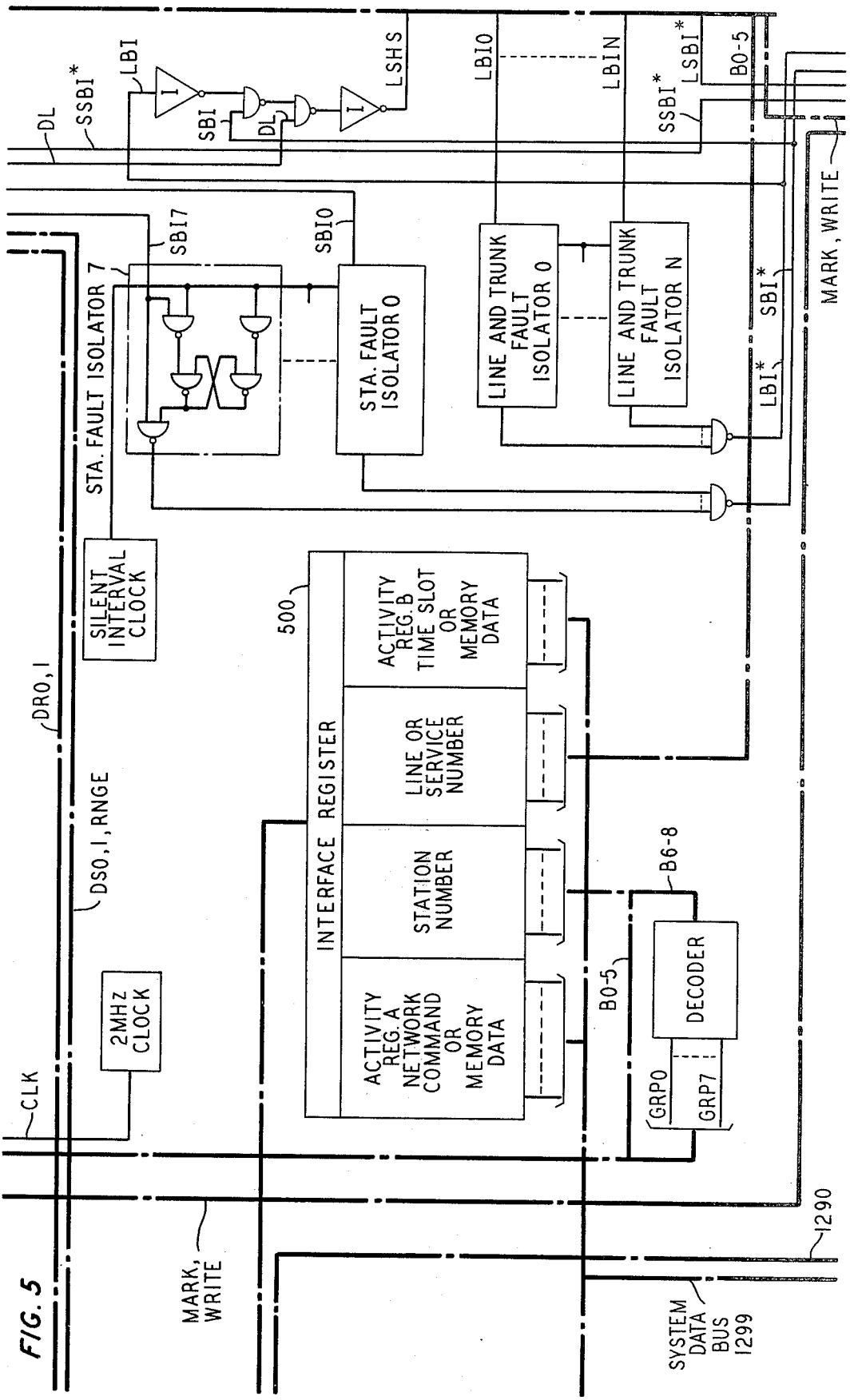
FIG. 5 shows the interface register and fault isolators of the illustrative key telephone system.

The two distinctive types of busy/idle bus systems eliminate the need for the central control to be equipped with a central memory for storing the assignment of busy and idle time slots. Instead, busy/idle information is directly obtained from the port circuits. To determine if a particular time slot is busy or idle, the status of the different station busy/idle buses SBI0 through SB17 is monitored. If any of these buses exhibits a low signal condition during the active interval of the time slot, it is to be understood that the time slot is assigned to one of the station port circuits associated with the particular station busy/idle bus SBI-. To determine whether a particular station is assigned a particular time slot, the station selected busy/idle bus SSBI in monitored during a frame of time slots when the particular station is addressed over the address buses from the interface register (FIG. 5). The station selected busy/idle bus SSBI exhibits a low signal state during the active interval of the time slot assigned to the addressed station port.

Central control addresses the port circuits by applying patterns of 0 and 1 bits to the MARK, WRITE and SELC buses appearing at the left-hand side of each of the station port circuits of FIGS. 1 through 5. The addressing of a port circuit results in the entering of a single bit into the port shift register circuit in accordance with the following table:

| MARK | WRITE | SELECT | FUNCTION |
| --- | --- | --- | --- |
| 0 | 0 | 0 | (NOT USED) |
| 0 | 1 | 0 | WRITE 1 |
| 1 | 0 | 0 | SELECTED WRITE 0 |
| 1 | 1 | 0 | RECIRCULATE |
| 0 | 0 | 1 | NONSELECTED WRITE 0 |
| 0 | 1 | 1 | RECIRCULATE |
| 1 | 0 | 1 | RECIRCULATE |
| 1 | 1 | 1 | RECIRCULATE |

From the above table it can be seen that there are two modes of write zero into a port shift register. One of these modes employs a bit on the select lead and the other mode does not. The second mode of writing zero into a port shift register is an "unselected clear" and is used by the central control to clear a particular time slot from every register in the system at once by writing 0 in the same stage of every port circuit shift register.

Figure 7:
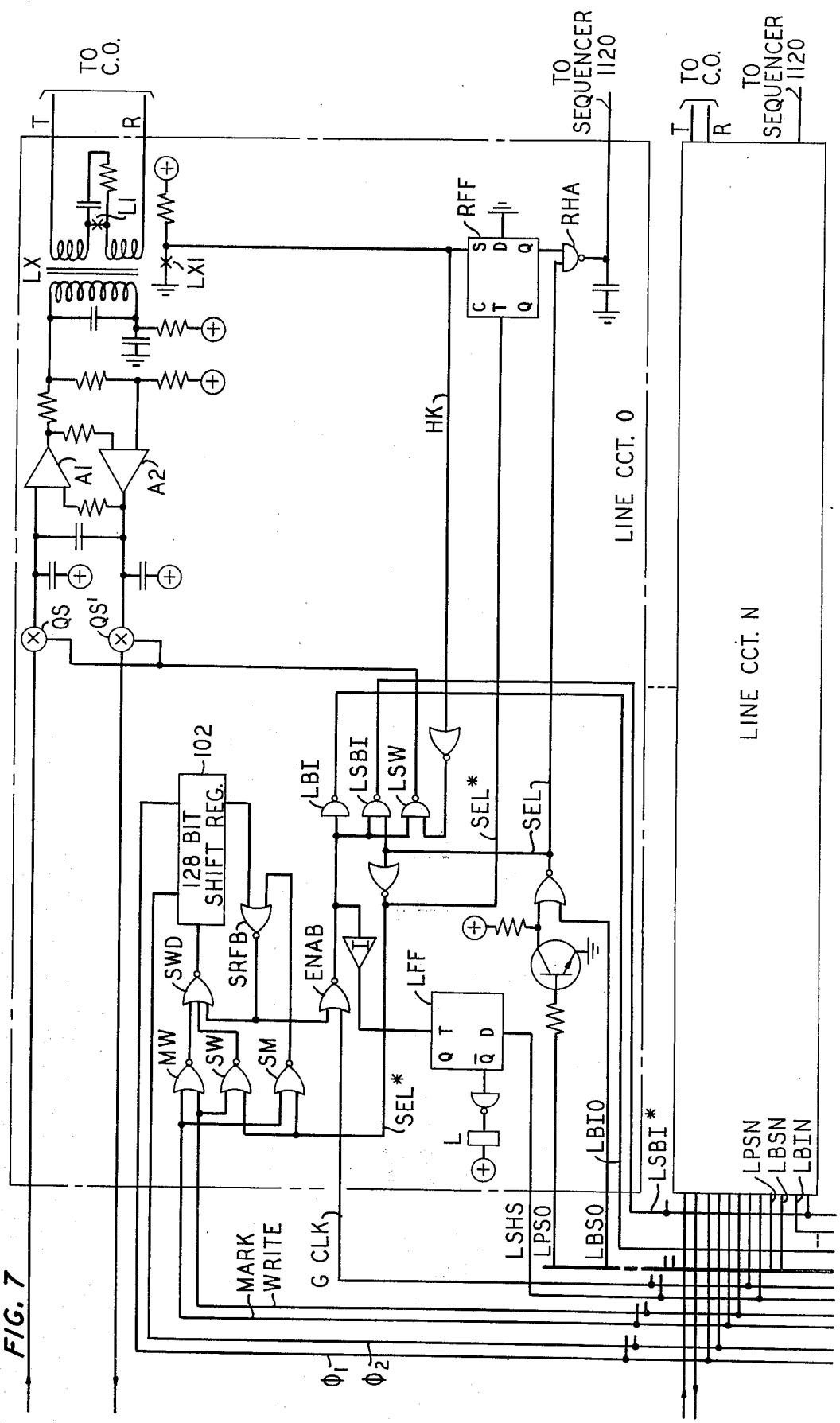
FIGS. 7 and 8 show respectively a line port and line centerboard circuit.
Figure 8:
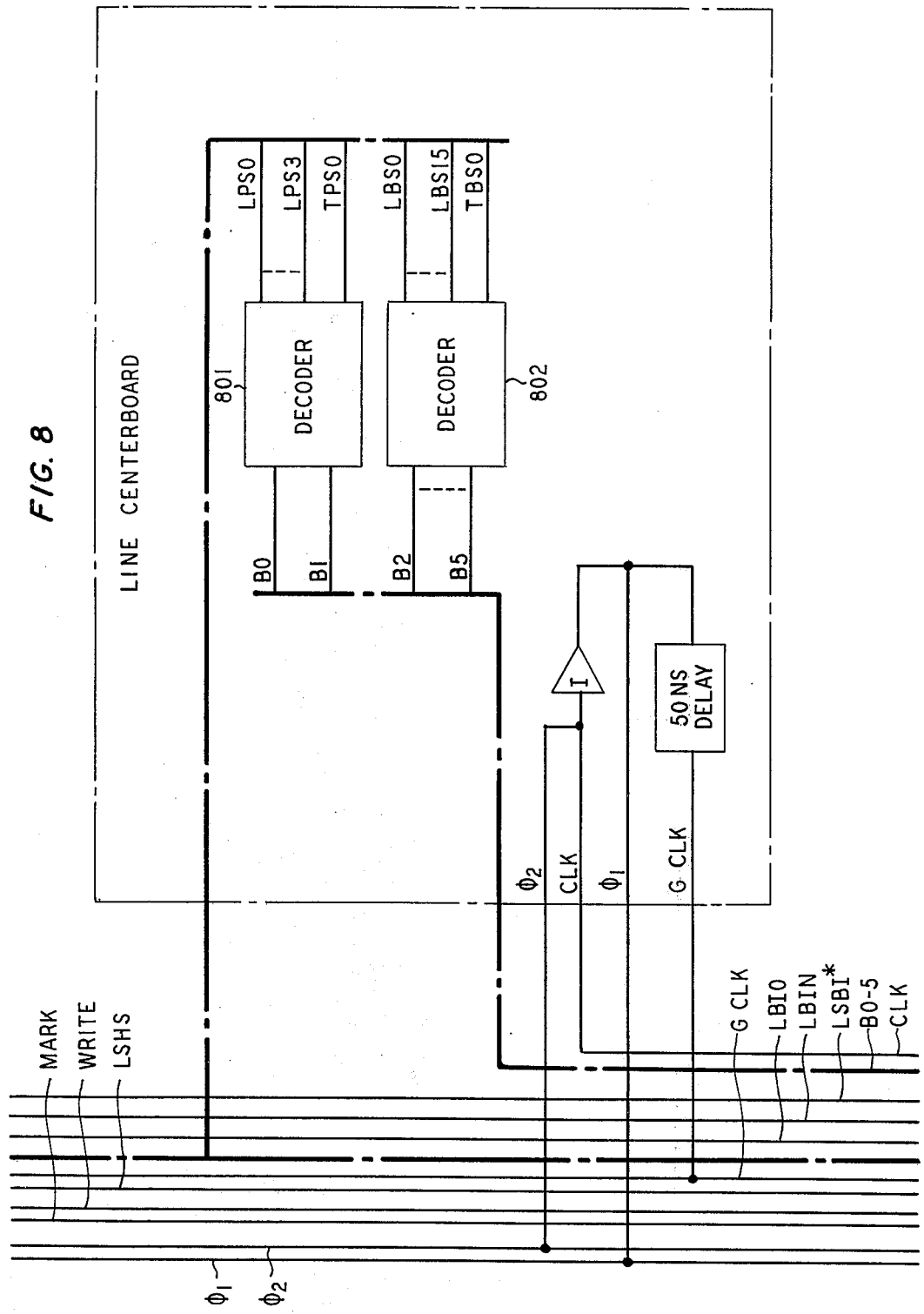

The arrangement of the electronic key telephone system shown in the drawing is such as to permit direct transmission of dial pulsing from the telephone set and station port circuit to a selected line circuit over a synchronous time division bus which includes conductor DL shown at the right-hand side of each of FIGS. 1 through 5 and conductor LSHS appearing at the left-hand side of FIGS. 7 and 8. For station sets that are equipped as disclosed in H. P. Anderson, et al U.S. Pat. No. 3,701,854 issued Oct. 31, 1972 for "dialing in the data stream", i.e., those in which the multifrequency push buttons of the set generate the normal tone signals and also transmit binary-coded representations corresponding thereto over the data link to the port circuits data transmitter and receiver, the binary-coded call signaling information is entered into data transmitter-receiver 202 of the station port circuit and forwarded over leads DRO,1 to the main controller and therein interpreted to effect appropriate network control.

Figure 2:
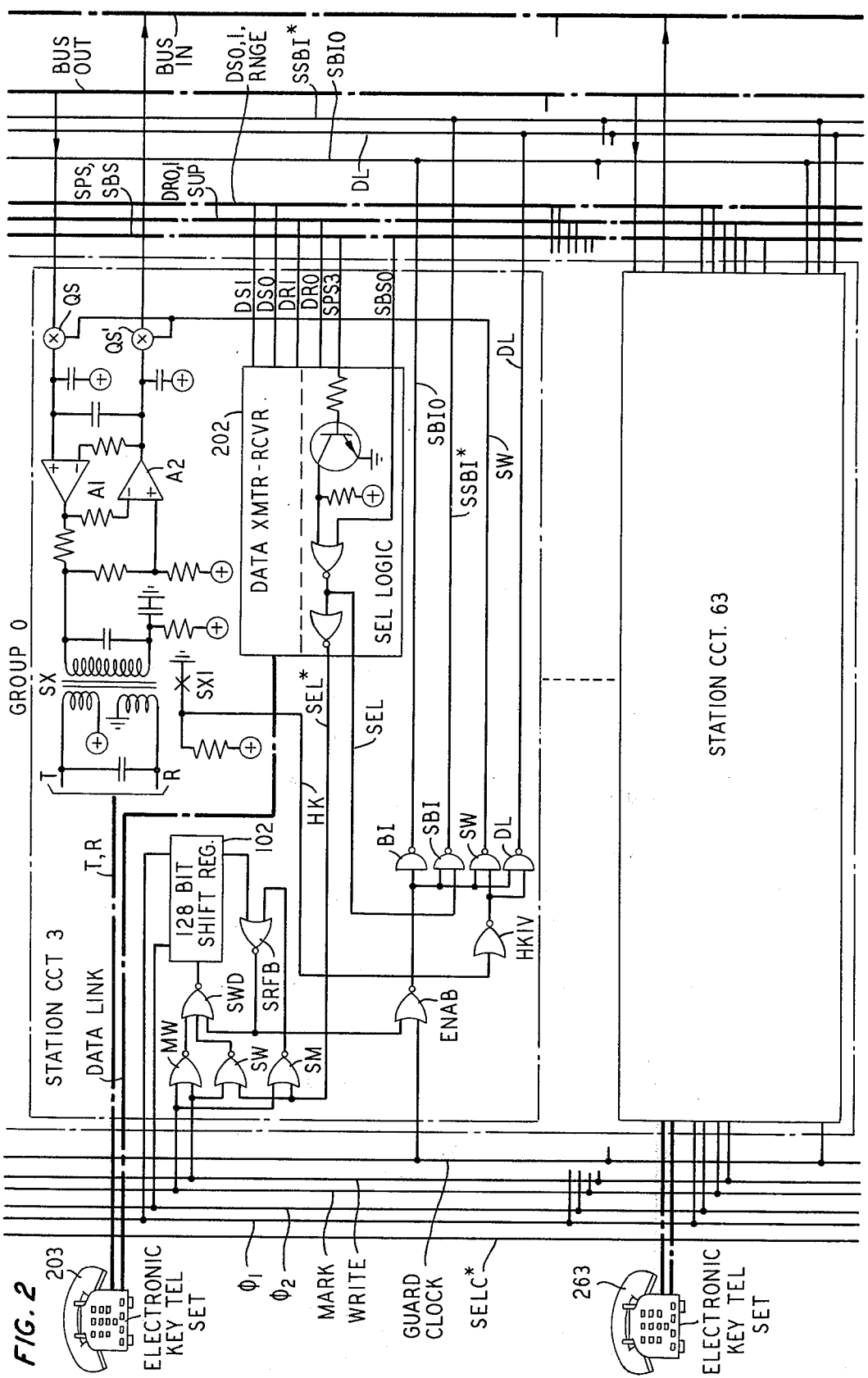
FIG. 2 shows a station port circuit for serving an electronic telephone set.

Station Port Circuits (FIGS. 1, 2)

The port circuit shift register 102 defines a 500 nanosecond interval for its associated time division communications bus switches QS and QS'. The first half of the interval is a turn-on pulse that enables the port switches to close thereby connecting the port to communications buses BUSIN and BUSOUT. The 250-nanosecond speech sample interval is followed by a 250-nanosecond quiet interval on the bus to provide crosstalk protection between adjacent time slots. Within shift register 102 a single bit is circulated stage to stage at a 2-megacycle repetition rate to define the 500-nanosecond output control interval. The 500 nanosecond control interval repeated once every 64.5 microseconds yields a 15.6 kHz sampling rate for the port.

Figure 4:
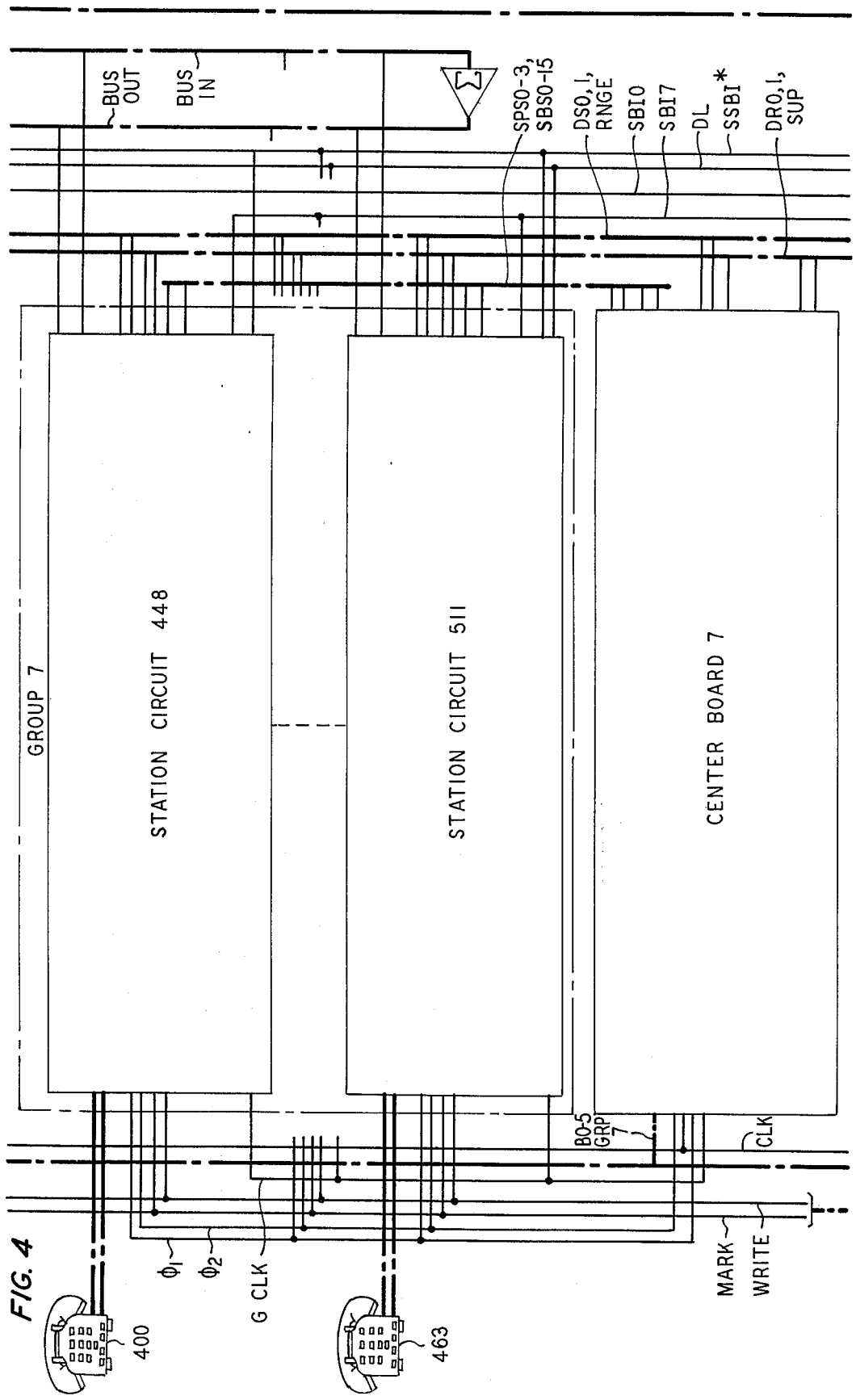
FIG. 4 shows the arrangement of a group of station port circuits with an associated interface circuit.

The coupling of the port to the input and output of the summing amplifier Σ FIG. 4 allows the port to put analog speech samples on BUSIN of the speech bus system for a 250-nanosecond interval and to receive analog speech samples over BUSOUT from any other port in the system. Referring to FIG. 2, station port circuit 3 includes a pair of time division sampling switches QS and QS'. During the sampling interval when the output of shift register 102 applies a control signal (over a path hereinafter to be more fully described) to switches QS and QS', the output of speech amplifier A2 is applied over time division switch QS' to speech bus BUSIN. Simultaneously, the signal level then existing on speech bus BUSOUT is applied over time division switch contact QS to the input of port amplifier A1. If the status of the time division switching network is such that station port circuit 3 is in communications connection with line port circuit 7 (FIG. 7), switch S1 in line circuit 7 will be closed at the same instant of time as switch OS' in station circuit 3. Sample applied through switch QS of line circuit 7 is applied to the tip and ring conductors extending to the central office.

In addition to the foregoing functions each of the station port circuits must (a) provide talking current to the station set, (b) route audio signals from the station to the time division bus and vice versa, (c) provide a logic signal which represents the state of the station set switchhook. Station port circuits serving electronic key telephone sets, such as station port circuit 3 of FIG. 2 must, in addition, transmit data to and receive control data from the central controller for transmission over the data link to the electronic key telephone set. Station port circuits serving conventional telephone sets, such as port circuit O of FIG. 1 must absorb control data from central control and transmit control data to the central or main controller in such a manner that the central controller will not be aware of the number of different kinds of sets appearing in the switching network. Talking current is provided by resistor battery feed through the center tap of a line transformer relay SX with which each station port circuit is equipped. Station set loop current flowing through the winding of transformer relay SX operates enclosed reed contact SX1.

The line circuits shown in FIG. 7 interface the switching network with central office lines. Each line circuit performs the following functions (a) provides a contact L1 to close the loop toward the central office for repeating dial pulsing, (b) couples audio signals between the time division bus and the central office line and (c) provides a logic level signal indicating the presence of conventional 20Hz ringing or the abandonment of the call by the central office end of the line circuit. Loop closure is accomplished advantageously by a mercury contact L1 of relay L. Ring detection is accomplished by the fluttering of the line transformer LX relay contacts LX1. Ring hold abandoned is detected by flip-flop RFF.

The supervisory state of the tip and ring conductors T, R of the station loop is monitored by a respective line transformer relay SX in the station port circuit of FIG. 1 serving a conventional no-button telephone set 101. Similarly, the port circuit serving each electronic key telephone set such as station circuit 3 in FIG. 2 includes a line transformer relay SX for monitoring the status of the station loop. The line transformers of both these circuits are each used to repeat loop status to whatever line circuit, FIG. 7, has been connected to the station circuit by means of the time division communications buses. As will be hereinafter explained in connection with the description of FIG. 5, the status of the station loop, once a time division connection has been established to a line circuit, is forwarded over a path that is independent of the main controller data communications buses DRO, 1; DSO, 1 as well as independent of the time division communications buses BUSIN, BUSOUT. The status of the station loop is reflected by the operated or released condition of contacts SX1 of the line transformer relay. When this contact is operated by closure of the station loop, ground potential is applied to lead HK and forwarded through inverter HKIV to the lower terminal of NAND gate DL. The signal is passed through NAND gate DL to conductor DL during the time slot assigned by the station port circuit. The state of lead DL during each time slot is forwarded through the circuitry of FIG. 5 to lead LSHS to control the line relay flip-flop LFF, FIG. 7, in the line circuit which is connected to the station circuit during that same time slot.

Lead HK of the no-button station port circuit O of FIG. 1 exhibits the high signal state so long as no station set loop current flows through the left-hand winding of line transformer relay SX. The high signal condition on lead HK is inverted by gate HKIV whose output causes NAND gates SW and DL to apply the high signal state to leads SW and DL, respectively. The high signal on lead SW allows the time division port switches QS and QS' to remain open-circuited. The high signal on lead DL is not meaningful at the present time. (The signal state on lead DL will be applied to gate 4 in FIG. 5 to indicate dial pulses when the station set is in the dialing condition.)

So long as the line transformer relay contact SX1 is open, the high signal resistance battery appearing on lead HK is applied to the center input of AND gate SUP1. In the absence of any change of state on lead HK, the $\overline{Q}$ output of one-shot circuit 166 maintains a high signal state on the upper input of AND gate SUP1.

Figure 3:
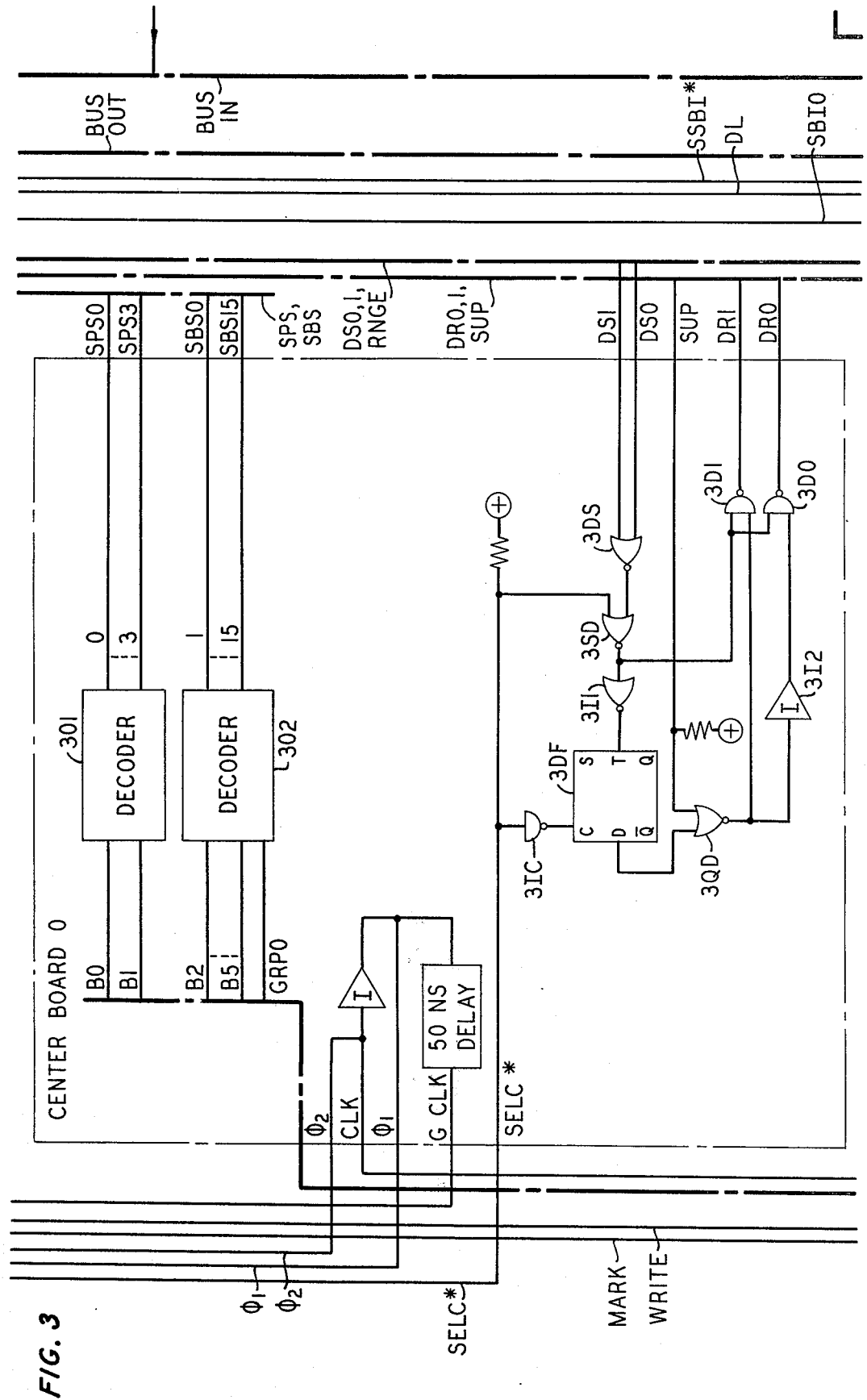
FIG. 3 shows inter alia the interface circuit for permitting conventional and electonic key telephone sets to return identical supervision signals to the main controller.

When no-button station circuit O of FIG. 1 is scanned by the main controller, enabling pulses are applied to leads SPSO and SBSO from decoders 301 and 302 of the centerboard circuit of FIG. 3. The signals appearing on these leads cause lead SEL to exhibit the high signal state. The high signal appearing on lead SEL is applied to the lower-most input of gate SUP1. With all of its inputs in the high signal state, gate SUP1 applies a high input signal to the upper input of NOR gate SUP. With a high signal applied to either of its inputs, NOR gate SUP applies a low signal at its output to supervisory bus SUP. The low signal applied to bus SUP is indicative of on-hook supervision and is returned to the centerboard logic in the lower portion of FIG. 3. As will hereinafter be explained more fully in connection with FIG. 3, the signal state on supervisory bus SUP is returned over leads DRO, 1 to the main controller during an appropriate pulse of the three-bit data sequence by means of which the main controller communicates both with port circuits serving no-button telephone sets as well as with port circuits serving electronic key sets.

When station 101, FIG. 1, goes off hook, a low signal is applied to lead HK. As will hereinafter be explained, the signal on supervisory bus SUP at the output of NOR gate SUP changes to the high signal condition after one-shot circuit 166 times out. At this point in circuit operation the delay in the supervisory state appearing on supervisory bus SUP incident to station set 101 going off hook is not significant. When station set 101 commences to dial, the continuity of the station loop through the primary of line transformer relay SX will be interrupted causing contact SX1 to release on each dial pulse. The dialing state will be repeated through inverter HKIV and gate DL to the dial bus DL. While it is desired that dial bus DL reflect the true supervisory state during dialing, it is not desired to cause the supervisory state on supervisory bus SUP to change each time a dial pulse occurs. As will hereinafter be more fully explained, it is also not desired to have the supervisory state of bus SUP change when contact SX1 flutters during ringing. The circuitry including delay gates A through D, NAND gates P and N and one-shot circuit 166 is provided to maintain the correct supervisory state on lead SUP.

Gates P and N are respectively actuated by positive and negative polarity transitional pulse on lead HK and, when actuated, deliver a negative going pulse of 40 nanoseconds duration to the triggering input of 100 millisecond one-shot circuit 166. Gates P and N each include a transistor, not shown, the collectors of which are connected together through resistance to battery. Gate P will operate to provide the negative going input pulse to the one-shot circuit when line transformer relay contact SX1 having been closed is released. Gate N produces the negative-going input pulse to one-shot circuit 166 when line transformer relay contact SX1 is operated. The duration of the negative-going pulse produced by gate P is determined by the cumulative delays in each of low power TTL logic gates, A, B and C, while the delays of gates B, C and D determine the duration of the output from gate N. More particularly, when the potential on lead HK undergoes a positive excursion, the change is immediately applied to the upper input of gate P, but is applied to the lower input of gate P only after passing through the individual gate delays of gates A, B, & C. On the other hand, the potential excursion on lead HK after appearing at the output of gate A is directly applied to the upper input of gate N, but is not applied to the upper input of gate N, but is not applied to the low input of gate N until after passing through the cumulative delays of gates B, C, & D.

When, during a dial pulse, line transformer relay contact SX1 is released, lead HK goes high. Three gate delays later, the lower input of gate P receives the high signal and gate P applies a low signal input to the T terminal of one-shot circuit 166.

When one-shot circuit 166 is triggered, its $\overline{Q}$ output applies a 100-millisecond long low signal to the upper input of AND gate SUP1 causing the output of this gate to go low and to apply a low signal to the upper input of NOR gate SUP. In order that NOR gate SUP continue to provide the high signal condition to supervisory bus SUP, it is necessary for the lower input of NOR gate SUP to be provided with a low signal as well. Since it is assumed that the station is in the dialing condition, the ring control flip-flop RCFF comprising cross-sectional NAND gates RNG and RNG* is assumed to be reset. Accordingly, ring control flip-flop provides a low signal to the center input of AND gate SUP2 causing its output, in turn, to apply a low signal to the lower input of NOR gate SUP. In summary, during the station loop open condition occasioned by a dial pulse, the triggered one-shot circuit 166 provides a low input through AND gate SUP1 to maintain a high signal condition on supervisory bus SUP at the output of NOR gate SUP. The 100-millisecond long low signal provided at the output of one-shot circuit 166 is sufficient to carry over the on-hook supervisory state between adjacent dial pulses. At the completion of dial pulsing, the low signal condition reappears on lead HK assuming that station set 101 remains off hook. 100 milliseconds after the completion of dialing, the low signal condition appearing on lead HK is applied to the center of input gate SUP1 and this signal becomes responsible for maintaining the correct supervisory state on supervisory bus SUP.

When the no-button station port circuit O of FIG. 1 is to apply a ringing signal to telephone set 101, the main controller sets ring control flip-flop RCFF. The manner in which the main controller applies signals to the conductor leads of bus DS0, 1, RNGE will be described hereinafter in connection with the three-bit data pulse sequence sent out over these control bus leads. Briefly, however, the main controller will apply a signal to lead DS1 to set flip-flop RCFF at the same time that a signal is applied to lead RNGE. The main controller resets the flip-flop RCFF by applying a signal to lead DS0 and RNGE. With the ring control flip-flop RCFF set, the high signal at the output of gate RNG is applied to an input of NAND gate RNGD. It will be assumed that station set 101 is on hook, that one-shot circuit 166 has not recently been triggered and that, accordingly, the left-hand input of NAND gate REL2 is in the low signal condition whereas the right-hand input is in the high signal condition. With one of its inputs in the low signal condition, the output gate REL2 provides a high signal output to the upper inputs of NAND gates RNGD and SUP2. Gate RNGD accordingly applies a low signal to the right-hand side of the winding of ring relay RNG, at whose transfer contact RNG1 superposed a.c. ringing is applied to the primary of transformer SX. On each cycle of ringing current, however, line relay transformer SX operates its contact SX1 which causes a low signal transition to appear on lead HK. It is not desired to have this low signal condition falsely indicate the off-hook supervisory state to the main controller as the main controller would then cause ringing to be tripped before the station user has answered. In order to prevent the false operation of line relay transformer SX1 from being reported to the main controller as an off-hook supervisory state, it is necessary to maintain the output of NOR gate SUP in the low signal condition indicative of an on-hook supervisory state.

Accordingly, when the line transformer relay contact SX1 operates on a cycle of ringing current, the low signal transition appearing on lead HK is inverted by delay gate A and is applied to the upper input of NAND gate N. Three gate delays later, the output of delay gate A will have traversed the serially connected delay gates B, C and D and will be applied as a positive signal to the lower input of NAND gate N. During the interval that the signal is traversing gates B, C and D NAND gate N has both of its inputs in the positive signal condition and applies at its output a negative trigger pulse to the T input of one-shot circuit 166. Output $\overline{Q}$ of one-shot circuit 166 will now be put into the low signal condition for an interval of 100 milliseconds. The low signal is applied to the right-hand input of NAND gate REL2 and to the upper input of AND gate SUP1. The low signal applied to the upper input of AND gate SUP1 causes a low signal to be applied to NOR gate SUP. This low signal, however, is not effective to produce the desired low signal at the output of this gate to report the maintenance of on-hook supervision to the main controller. The low signal condition at the right-hand input of NAND gate REL2, however, is effective to produce a high signal at the output of NAND gate REL2 to maintain the ringing relay RNG energized as well as maintain the output of AND gate SUP2 in the high signal condition. Accordingly, the low signal output of one-shot circuit 166 is effective through gates REL2 and SUP2 to maintain a high signal on the lower input of NOR gate SUP. With the high signal applied to its lower input, NOR gate SUP is effected to maintain a low signal indicative of on-hook supervision on supervisory lead SUP. The 100-millisecond duration of this signal is sufficient to carry over between cycles of a ringing current.

When the station user removes the handset from the switchhook of telephone 101 to answer the ringing phone, line transformer relay SX will operate its contact SX1 steadily. After one-shot circuit 166 times out, since no further transitions occur on lead HK, a high signal will be provided at the right-hand input of NAND gate REL2. The left-hand input of this gate receives a steady high signal from the output of gate A. Accordingly, NAND gate REL 2 will apply a low signal to the upper input of NAND gate RNGD causing the output of this gate to go high and to release ringing relay RNG immediately retiring ringing. At the same time, the steady low signal condition on lead HK causes AND gate SUP1 to provide a low input signal to the upper input of NOR input SUP. Gate REL2 applies a low input to the upper input of AND gate SUP2 which, in turn, applies a low input to the lower input of NOR input SUP. Since NOR gate SUP now has both of its inputs in the low signal condition, it applies a high signal state to supervisory lead SUP. The main controller presenting receiving off-hook supervision in response to ringing will apply simultaneous pulses to leads RNGE and DS0 to reset ring control flip-flop RCFF. However, the connection between gates REL2 and RNGD provides tripping of ringing within 100 milliseconds of station answer in the event that the main controller is otherwise occupied at the time off-hook supervision is applied to lead SUP. Accordingly, it is seen that the one-shot circuit and associated logic of the no-button station circuit prevent the temporary release of contact SX1 during dialing and the temporary operation of contact SX1 during bursts of ringing from indicating incorrect supervision to supervisory lead SUP.

Description of Cirucit Board Servicing Conventional Telephone Sets (FIG. 3)

Referring now to FIG. 3, there is shown a centerboard circuit for serving station port circuits. In the upper portion of the centerboard are decoders 301 and 302 for decoding the signals on leads BO through B5 that exhibit coded patterns of signals identifying the station number being accessed by the main controller through the interface register 500 in FIG. 5. Decoder 301 decodes the binary pattern on leads BO and B1 to apply an output on one of the four leads SPSO through SPS3. These "station port select leads" define four groups of station port circuits (FIGS. 1 and 2). Decoder 302 detects the pattern of signals on leads B2 through B5 to select one of the 16 output leads SBSO through SBS15. The combination of an energized one of the SPS- and the SBS- leads results in the selection on one of the 64 station port circuits associated with the centerboard shown in FIG. 3.

In the lower portion of FIG. 3 is shown the circuitry that enables port circuits serving conventional telephone sets to report the switchhook status of their associated telephones to the main controller in the same manner as the port circuit associated with an electric key telephone set. The format used by the main controller for communicating with all port circuits is the same and comprises a 3-bit data sequence transmitted on leads DSO,1 to the port circuits from sequencer 1120 (FIG. 11) under direction of signals applied by the main controller to systems data bus 1299. Each bit of the data sequence applied to leads DSO,1 which compels the return of a response bit from the port circuit accessed by interface register 500.

Normally, the first bit of the 3-bit sequence is ring bit RA. The station port accessed by the appearance of its station number in interface register 500 receives ring bit RA and returns a dial status bit to sequencer 1120 over leads DRO,1. The transmission of ring bit RA by the sequencer to the accessed port circuit occurs during the station processing interval. Depending upon the distance between the accessed station port and sequencer 1120, the compelled response D bit applied by the accessed port circuit to leads DRO,1 may arrive at sequencer 1120 during or after the end of the station processing period.

The next bit of the data sequence transmitted by the sequencer is transmitted during the active line processing period. This bit is the second ring bit RB. In response to receiving ring bit RB, the station port returns the switchhook bit SH on leads DRO,1. The last bit of the 3-bit data sequence is transmitted during the button processing period. This bit is the lamp bit and in response to the lamp bit the station port returns a button bit on leads DRO,1 which indicates whether or not the button being processed has been pushed.

The foregoing 3-bit data sequence is the normal mode of operation determined by the main controller because the majority of stations being serviced are expected to be of the electronic key button types. However, many installations will require that one or more conventional telephone sets also be serviced. In order that these sets may be properly served by the main controller, it is desirable to return switchhook status information from these sets in the same fashion as for the electronic key telephone sets. The main controller, however, normally also expects to receive the D bit on the DRO,1 bus prior to receiving the switchhook bit and also expects to receive the button bit after the switchhook bit. In accordance with an aspect of the illustrative embodiment, the circuitry in the lower portion of the centerboard enables a port circuit serving a conventional telephone set to report its switchhook status in the same manner as port circuits serving electronic key telephone sets.

When sequencer 1120 applies the first bit (ring bit RA) of the three-bit data sequence to leads DSO,1, the signal takes the form of a 2-microsecond long high pulse applied to either of leads DSO,1. During the continuance of the high signal applied to either or both of leads DSO,1 the output of NOR gate 3DS, FIG. 3, exhibits a 2-microsecond long low signal condition. With the port circuit serving a conventional telephone set being selected by the station number in interface register 500, the low signal appearing on SELC* together with the 2-microsecond long low signal appearing at the output of NOR gate 3DS enables NOR gate 3SD to provide a 2-microsecond long high signal at its output.

During the continuance of this first 2-microsecond long high signal at the output of gate 3SD the upper inputs of NAND gates 3D1 and 3D0 are enabled. It will be noted that the lower inputs of NAND gates 3D0 and 3D1 are provided with opposite polarity signals from the output of NOR gate 3QD. (The lower input of gate 3D1 receives the output of NOR gate 3QD directly whereas the lower input of NAND gate 3D0 receives the output of NOR gate 3QD inverted by inverter 3I2.) Consequently, during the continuance of the first 2-microsecond pulse applied to leads 3DS0,1 one or the other of NAND gates 3D0 and 3D1 will apply a 2-microsecond long low signal to its respective one of leads DRO,1. Thus, the circuit in the lower half of the centerboard has caused a return pulse to be forwarded to the main controller in response to the first bit of the three-bit data sequence transmitted by the main controller.

During the selection of a port circuit serving a conventional, no-button, telephone set, the high signal on the SEL lead of the circuit causes lead SELC* to exhibit a low signal condition. The low signal condition on lead SELC* is inverted by inverter 3IC and removes the clear signal to flip-flop 3DF. The high signal applied to the C input of the flip-flop primes the flip-flop and allows the flip-flop thereafter to be set when a positive-going toggle pulse is applied to its toggle input T. The positive-going toggle pulse will be provided to the T input via inverter 3I1 and gates 3SD and 3DS after the termination of the first pulse of the three-bit data sequence appearing on leads DS1 and DS0.

More particularly, the low signal condition appearing on lead SELC* during the selection of the port circuit serving the telephone set primes the upper input of NOR gate 3SD. When the first bit of the three-bit data sequence is applied to leads DS1 and DS0 by sequencer 1120, FIG. 11, the output of NOR gate 3DS exhibits a low signal condition.

During the first bit of the three-bit data sequence, the $\overline{Q}$ output of flip-flop 3DF, being high, forces the output of NOR gate 3QD to exhibit the low signal condition regardless of the state of the supervisory bus SUP. The low signal at the output of NOR gate 3QD is inverted by inverter 3I2 and applied as a high signal to gate 3DO. Since the upper input of gate 3DO is also in the high signal condition, gate 3D0 applies a low pulse to be sent on lead DR0 to sequencer 1120, FIG. 11.

In the illustrative embodiment the first signal pulse bit applied to leads DS0,1 may persist for an interval of 2 microseconds and will be separated from the onset of the next pulse on the same lead by at least 4 microseconds. With the termination of the pulse gate 3SD will apply a low-going signal to the input of inverter 3I1 which in turn will apply a high-going or toggling signal to the toggle input T of flip-flop 3DF. The toggling of flip-flop 3DF causes output Q to exhibit the low signal condition enabling NOR gate 3QD to reflect at its output a signal condition which is the inverse of the signal condition appearing on lead SUP. The signal appearing on lead SUP is supplied by the selected port circuit serving the conventional telephone set. Accordingly, at the end of the first pulse of the 3-bit data pulse sequence applied by sequencer 1120 to leads DS0,1 a compelled response pulse has been returned by the centerboard circuit to the sequencer and the centerboard has been primed by the setting of its flip-flop 3DF to reflect the condition of lead SUP.

The next bit of the data sequence transmitted by sequencer 1120 is ring bit RB in response to receiving ring bit RB. The centerboard associated with a selected no-button station circuit returns a switchhook bit SH on leads DRO,1 that reflects the switchhook state of the associated no-button telephone set. This switchhook information is made available to the centerboard circuit by the signal state appearing on lead SUP. The state of lead SUP is applied through gate 3QD to the lower inputs of NAND gates 3D0 and 3D1 to leads DR0,1 simultaneously with the arrival of the second pulse of the three-bit data sequence. More particularly, when the ring bit RB is applied as a 2-microsecond duration high signal to either of leads DS0,1, the output of gate 3DS exhibits a low signal which is applied to the lower input of gate 3SD. The upper input of gate 3SD is maintained in the low signal condition by lead SELC* so long as the port circuit under consideration is being considered. Gate 3SD being enabled by the low signal on lead SELC* applies a 2-microsecond long high signal to the upper inputs of gates 3D1 and 3D0. The lower inputs of these gates reflect the inverted signal condition appearing on lead SUP. Accordingly, gates 3D1 and 3D0 pass to return bus leads DR1 and DR0 the switchhook state of the associated no-button telephone set during the interval that ring bit RB is applied to leads DS0 and DS1.

With the termination of ring bit RB, a negative going pulse is applied by gate 3SD to inverter 3I1. The inverter applies another toggling input to flip-flop 3DF causing output $\overline{Q}$ to block gate 3QD. In the block state, the output of gate 3QD applies a low signal to NAND gate 3D1 forcing its output to be high when the third pulse of the three-bit data pulse sequence appears on lead DS0,1. Conversely, gate 3D0 will apply a low signal to gate DR0 at this time.

Accordingly, the circuitry in the lower half of the centerboard causes leads DR1 to exhibit a high and lead DR0 to exhibit a low signal condition during the first and third pulses of the three-bit data pulsing sequence and to exhibit signal conditions which are indicative of the switchhook state of the associated no-button port circuit during the second bit of the three-bit data pulse sequence.

Figure 12:
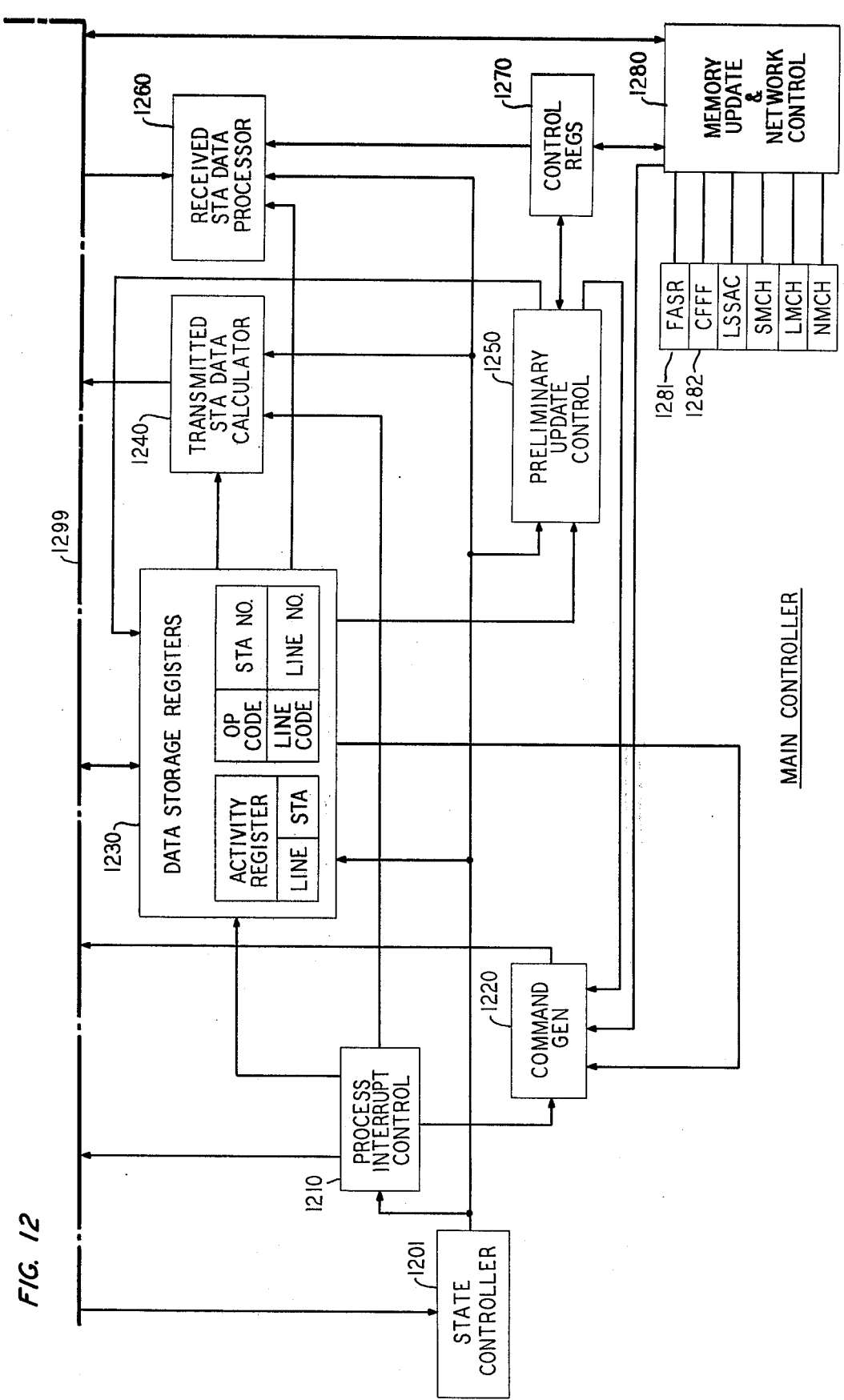
FIG. 12 shows the main controller.

Description of Main Controller (FIG. 12)

The main controller of the present system defines four basic processing intervals, namely, station, active line, button and memory and network update. This processing arrangement differs in several respects from the processing arrangement employed in an earlier electronic key telephone system which is described in L. P. Fabiano, Jr. U.S. Pat. 3,637,939 issued Jan. 25, 1972. In the prior system, a single interval was allocated for data transmission between the central control unit and the line and station circuits. The data transmitted from the central control to the line and station circuits controlled, in the case of the station circuits, the application of ringing and the ilumination of the key button lamps and, in the case of line circuits, the state of the line loop to the central office. Data returned to the central control included the switchhook status and the identity of the operated key button at the station as well as the loop status of the line from the central office.

Figure 11:
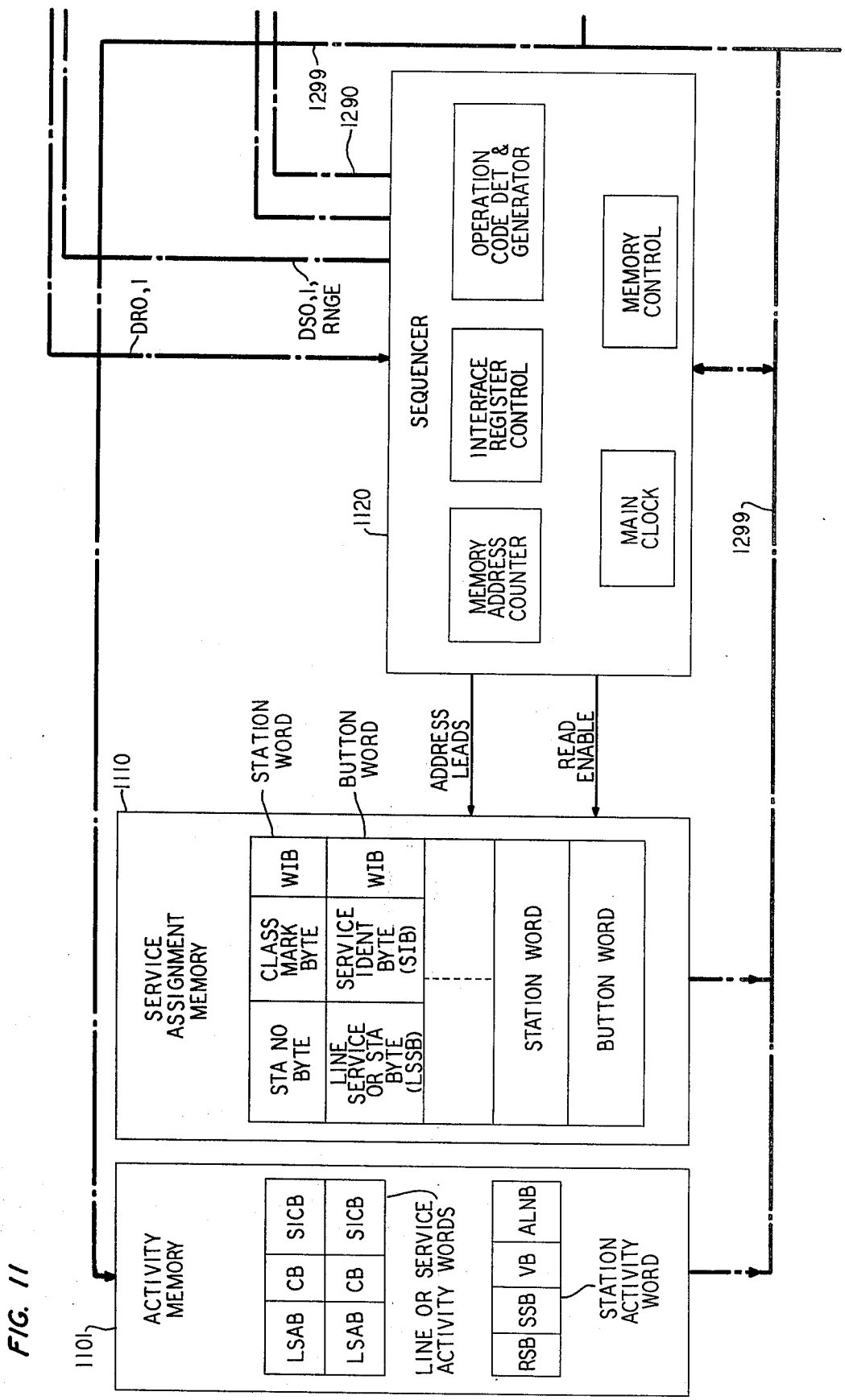
FIG. 11 shows the activity and service assignment memory units and the system sequencer.

In the present embodiment, data is transmitted between the sequencer 1120, FIG. 11, of the main controller, FIG. 12, and the station and line ports FIGS. 1 through 4 and 7 and 8 during each of three processing periods. Data is transmitted during station processing, during active line processing and during processing of the station's key button.

Figure 16:
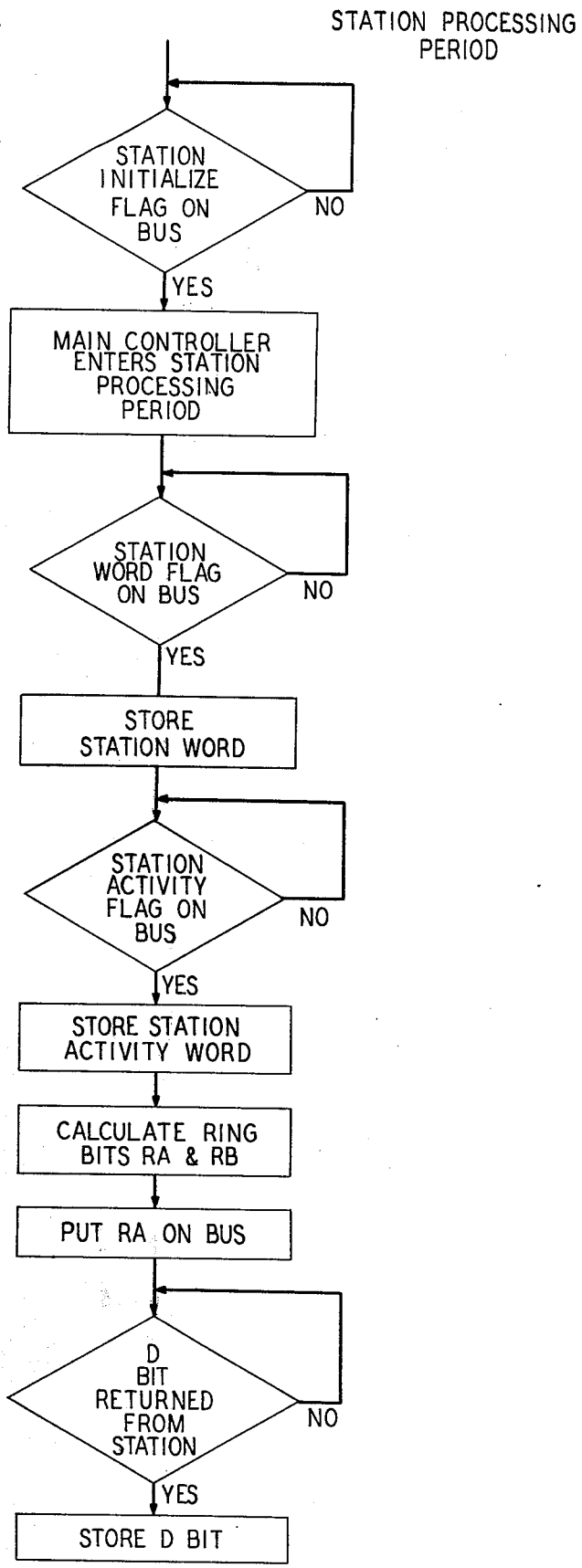
FIGS. 16, 17, and 18 show flow diagrams for the station, line and button processing periods, respectively.

During the station processing period shown in flow diagram FIG. 16 and timing diagram FIG. 16A, data is first transmitted to the station ports when sequencer 1120 commands the service assignment memory 1110 to place a station translation word and the station activity work on the peripheral bus 1299 to the main controller, FIG. 12. The main controller functions at this time to detect this data on peripheral bus 1299 and to store it in data storage registers 1230. Using the stored information, particularly the ring status byte RSB of the station activity word, station data calculator 1240 in the main controller calculates a ring bit which is placed on peripheral bus 1299 to sequencer 1120. Sequencer 1120 accepts the ring bit and translates it into the appropriate format for transmission as ring bit RA over the appropriate leads of buses DS0,1 to the station port being processed. The station port receives the ring bit RA and returns a dial status bit D to the sequencer over the appropriate leads of bus DRO,1. Depending upon the distance between the station port and the sequencer-main controller, the D bit on the DR0,1 bus may be received during or after the end of the station processing period.

Figure 17:
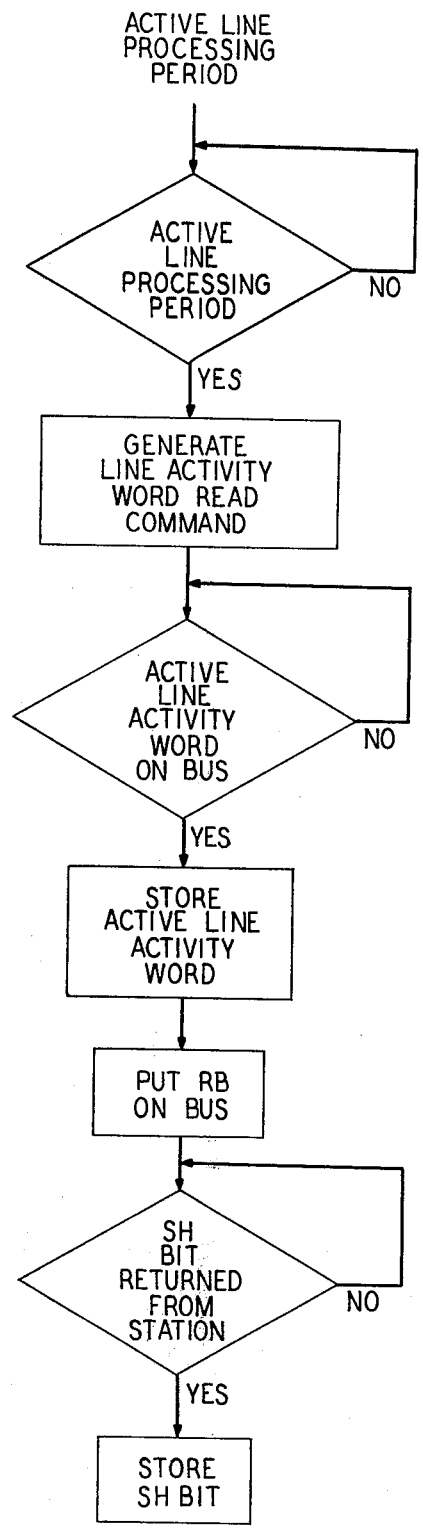

An active line processing period shown in flow diagram FIG. 17 and timing diagram FIG. 17A begins at phase T0 following the station processing period at which time sequencer 1120 is directed to read the activity memory and to put the station's active line activity work on peripheral bus 1299. The word on this bus is then stored in main controller data storage registers 1230. The main controller then puts the second ring bit RB on the bus. In response to receiving ring bit RB the station returns the switchhook bit SH on the DR0,1 bus. As was the case with the dial status bit D, the switchhook bit SH may be received by the main controller during the same processing period or somewhat later.

Figure 18:
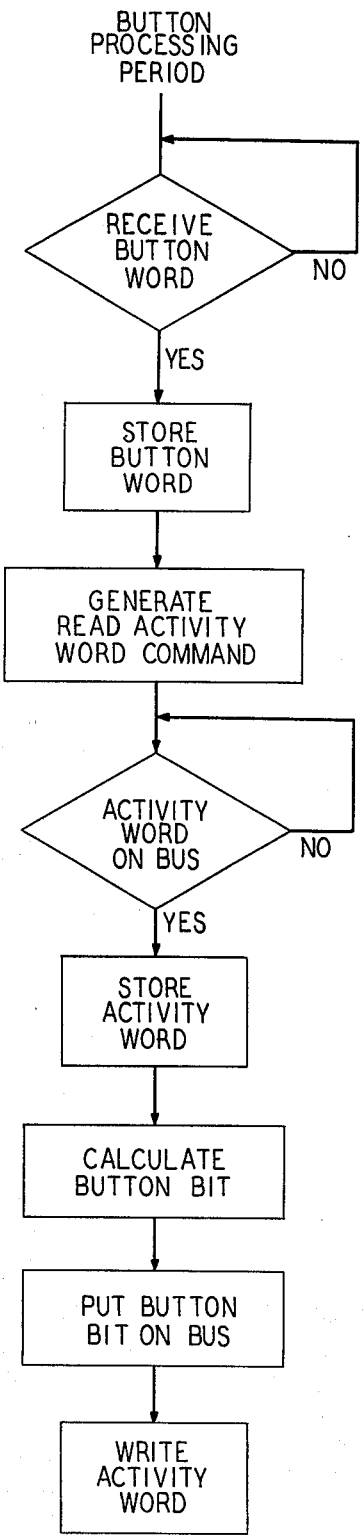

Each button on a station set is processed during a six-phase processing period shown in flow diagram FIG. 18 and timing diagram FIG. 18A. The length of the button processing period for a particular set is therefore a variable determined by the number of active buttons with which the station set is equipped. At the beginning of each button's processing period sequencer 1120, FIG. 11, causes the service assignment word for the button such as button word 1112 to be transferred from memory 1110 of the main controller, FIG. 12. The main controller then determines from the service identifier byte the service assigned to the button and generates a command to read the appropriate one of activity memory words for the line or service in activity memory 1101 FIG. 11, and to store that activity work in data storage registers 1230. Transmitted station data calculator 1240 uses the priorly stored service assignment byte and activity word for the station together with the button's service assignment and activity words and calculates the lamp bit for the button. The lamp bit is transmitted to the station which responds over the DRO,1 bus with a button bit indicating whether or not the button being processed has been pushed. Again, depending on the distance from the station circuit to the main controller, the button bit may not be received until after this button's processing period. This process is carried out for each programmed button on the station set.

After a station's last button has been processed, sequencer 1120 scans data bus 1299 to see if any units have indicated a change of state during the button processing period. The sequencer enables each of these units in turn to process its changes. When the main controller FIG. 12 is enabled by the sequencer, it enters its memory update and network control processing period. During this time, the main controller generates commands to change connections in the network and to update the station line and service activity memories. When the main controller has finished its tasks, it generates an exit command and then waits until the processing of the next station begins.

Description of the Activity Memory, Service Assignment Memory and Sequencer (FIG. 11)

Two types of memory units are employed in the present embodiment. A service assignment memory 1101 is used to translate the messages received from a station set into specific service requests. The activity memory 1101 is used to store the current activity of lines, stations, and services in the system. This activity information is determined by detecting incoming calls for lines and state changes received from the stations. The information stored in the service assignment memory is combined with current activity information stored in the activity memory to generate the lamp and ring messages that are transmitted to the stations. The call processing operations are performed by the main controller, FIG. 12, in conjunction with the sequencer 1120 of FIG. 11. The sequencer is organized to sequentially scan each station and each of its assigned buttons. Each station is scanned at the 25-millisecond rate to detect dialing states and for ringer control and at a 50-millisecond rate for detection of the button and switchhook states and for control of its key button lamps.

Service assignment memory 1110 is a reprogrammable memory which advantageously operates in a read-only mode to identify and to assign services to stations. Advantageously an insulated gate field effect transistor element may be employed. Service assignment memory 1110 is organized with a single word for each station, the so-called station word and with a respective word, the button word, for each button assigned on a particular station set. A station is associated with a particular group of words in service assignment memory 1110. A group consists of a station word which identifies the station and a number of button words which define the services assigned to each button. The exact number of the button words for each station depends on the number of buttons on the station set which are to be assigned services accessible to the station set user. Every button on a station up to and including the last assigned button will have a corresponding button word. For example, a 6-button station set having its first three buttons assigned to different services will have three button words in the word group assigned that station in the service assignment memory. A rearrangement of the assignment of these buttons so that the first two services would be accessible to the first two station set buttons with the remaining service assigned to fifth station set button would require the assignment of five button words for the station in service assignment memory 1110. The two unassigned buttons between the second and fifth station set buttons would be programmed as blank buttons in memory 1110.

As shown in FIG. 11, the station and button words are identified by means of a bit termed the word identifier byte. The identifier byte WIB is set to 0 for station words and to 1 for button words. Two additional bytes are contained in each station and button word. The station word contains a 6-bit station class mark byte which is used to assign services that do not require special service buttons and can usually be applied to any of a station's lines. These types of services are station-oriented services and constitute a class of service for the station. For example, if the key system is to be equipped with automatic pick-up service that can apply to any of the station's line appearance, this service will be assigned to the station by means of its station class mark byte.

The station word also contains a station number byte. This number is an equipment number that represents the location of the port at which the station's cable is terminated on the equipment rack. The station number is a 9-bit binary number and accordingly may identify 1 out of 512 possible stations.

The button word contains the single bit word identifier byte, the service identifier byte SIB and a line service or station byte LSSB. The service identifier byte identifies the service assigned to the button. The line service or station byte is a 9-bit number which may serve as a line number when the button is assigned to access a line in which case the 9-bit code may identify 1 out of 512 possible lines. The line number is the LSSB of the button word is also used to access the correct location in activity memory 1101 in which the activity of the line is stored. The LSSB may also be used to store the number of the equipment port at which central office, direct lines or off-premises intercom lines may be terminated. The LSSB of a buttom word may also be used to identify line applied services such as hold, exclusive, and conferencing. A particular line applied service is identified by means of coding within the LSSB of the button word for the service.

Activity memory 1101 is advantageously a random access read-write IGFET memory and may contain 512 36-bit words. The activity memory is divided into a station section and a service section. Each word in the station section stores one station's activity while the current activity of a line or service is stored in the service section.

A particular station activity word is addressed using the station's corresponding station number from service assignment memory 1110. Each station word in the station section activity memory 1101 comprises an active line number byte ALNB (9 bits), a ring status byte RSB (2 bits), a switchhook status byte SSB (3 bits) and a verified byte VB containing 2 bits. The ALNB byte stores the line number to which the station is or will be connected by the switching network when the station is in the off-hook state. The ALNB normally has a line number stored in it regardless of whether the station is on or off hook. When the station is on hook and has not preselected a line, the ALNB of its station activity word corresponds to the station's prime line, ringing line or last off-hook line. Preselecting a line button causes that button's line number to be stored in the ALNB. The RSB byte indicates the ringing state of the station. These bits are periodically updated and are used to control the ringer at the station. The two-bit RSB may be coded to provide 10 or 20 Hz ringing or other ringer state control signals.

The verified byte VB and switchhook status byte SSB may be used to verify button and switchhook changes that occur in a station. A change may be required to be received from a station during two consecutive processing scans of the station before the change is processed as a verified change. The two-bit VB may be coded to represent a released button state, an unverified button state change, a verified button state change or an unverified button release. The verified byte is in the released state when no buttons are being pushed. The first time that a station is processed and a button-being-pushed state is detected, the verified byte is set to the unverified change state. The next time the station is scanned and the station is detected as having pressed the button, the VB is set to the verified change state and the service request is processed. The VB is returned to the released state when the station set user releases the button and the release is verified.

The switchhook status byte SSB is coded to verify the off-hook state. The three bits of the SSB may be coded to represent the on-hook state (111), an on-hook preselected state (110), an off-hook unverified or not connected state (101) and an off-hook verified and connected state (100). A station which is on-hook will have its corresponding SSB set to the on-hook state. The SSB may be updated to the on-hook preselected sate if a line button is preselected to override automatic pick-up service. The first time a station is processed and an off-hook state is detected, the corresponding SSB is set to the off-hook unverified state. The next time the off-hook station is processed for switchhook and button changes (50 milliseconds later), the off-hook state is verified and an attempt is made to connect the station to the line corresponding to the line number stored in the ALNB.

The off-hook unverified or not connected state may also be utilized when the main controller is busy performing another task which prevents it from immediately connecting the station to the line indicated by the number in the ALNB. To defer the new connection until the main controller is available, the SSB may be left in the off-hook unverified or not connected state. The main controller will then "try again" the next time the station involved in the connection is processed. The SSB may also be caused to be in the off-hook unverified or not connected state when all time slots of the time division voice network are busy. The three-bit SSB may be also used to verify and time the on-hook state of the station. Three-bit codes may be assigned to represent the on-hook unverified state (011); the on-hook verified, not connected state (010); on-hook first count (001) and on-hook second count (000). The SSB is updated from the off-hook verified and connected state (100) to the on-hook unverified state (011) when an on-hook condition is detected for the station. The on-hook condition is updated to a verified state (010) and the station is disconnected after two successive scans 50 milliseconds apart reveal that the station is still on-hook. Once the on-hook verified and not connected state (010) is reached, a counting sequence is started. This counting sequence may use a two-second clock to increment the SSB from the verified on-hook not connected state (010) to the on-hook state (111). The just-described counting sequence is principally useful in connection with performing dial tone recall. Dial tone recall service permits a station user to depress his switchhook to recall dial tone on his active line. If the station user depresses the switchhook for less than four seconds, the station will be reconnected to its active line. If the switchhook is depressed for greater than 4–6 seconds, the station's active line may change to its prime line or first ringing line. These lines may be automatically selected as the station's active line when prime line or ringing line preference service is assigned to the station in the class mark bytefor the station word in service assignment memory 1110.

As mentioned previously, the service section of the activity memory stores the current activity of the lines. This section is addressed by the LSSB obtained from the service assignment memory. A word in the service section of the activity memory consists of three bytes: a line or service activity byte LSAB, a count byte CB, and a station in control byte SICB. The LSAB consists of five bits and is used to represent the particular activity of a line or service. The count byte CB consists of three bits and may be used to perform counting functions involved with a particular service, for example, timing for hold abandon or to verify ringing detection. The 9-bit SICB is provided so that a station which places a line on hold may receive a unique lamp indication on the hold line appearance button. The SICB of the held line's activity word is used to hold the station number of the station placing this line on hold.

The activity of a line is updated to busy when a station originates a call on the line. The station number of the originating station is written into the SICB at this time. The activity of a line is cleared to idle when all stations using the line hang up. Line clearing may be performed by means of a repetitive, three-cycle operation involving the CB. Each cycle involves one complete 50-millisecond scan of all the stations and buttons. The CB of all active lines are set to a particular count code during a first of the three cycles. The CB of a line which has at least one station off-hook and connected to it is incremented during the second cycle. During the third cycle, the activity byte, CB and SICB of all lines which continue to have the first count written in the CB are cleared to the idle state. This manner of clearing lines is analogous to the manner of clearing lines described in the above-mentioned Fabiano Pat. No. 3,637,939.

Figure 6:
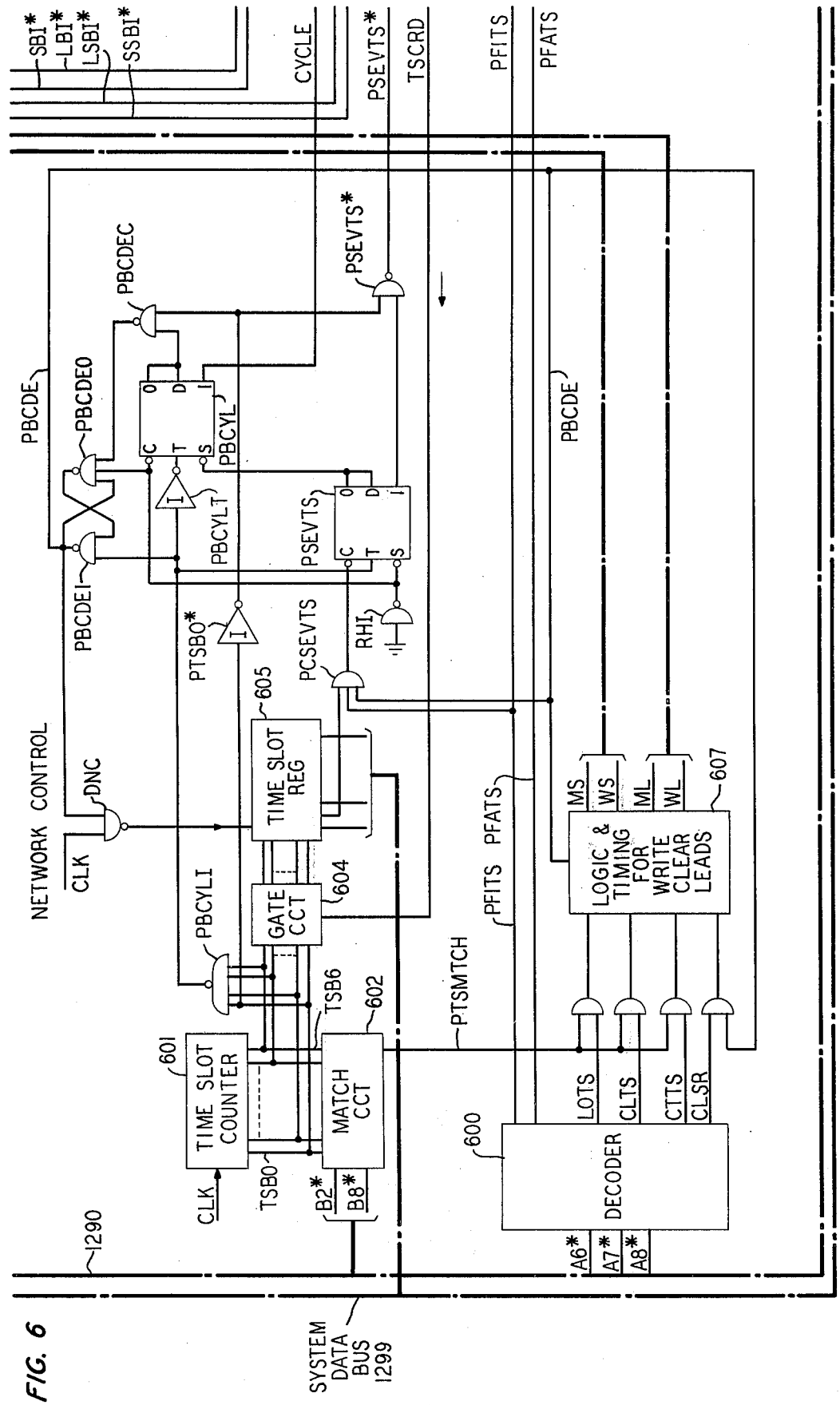
FIGS. 6 and 10 show the network control and a portion of the audit logic of the illustrative key telephone system.
Figure 10:
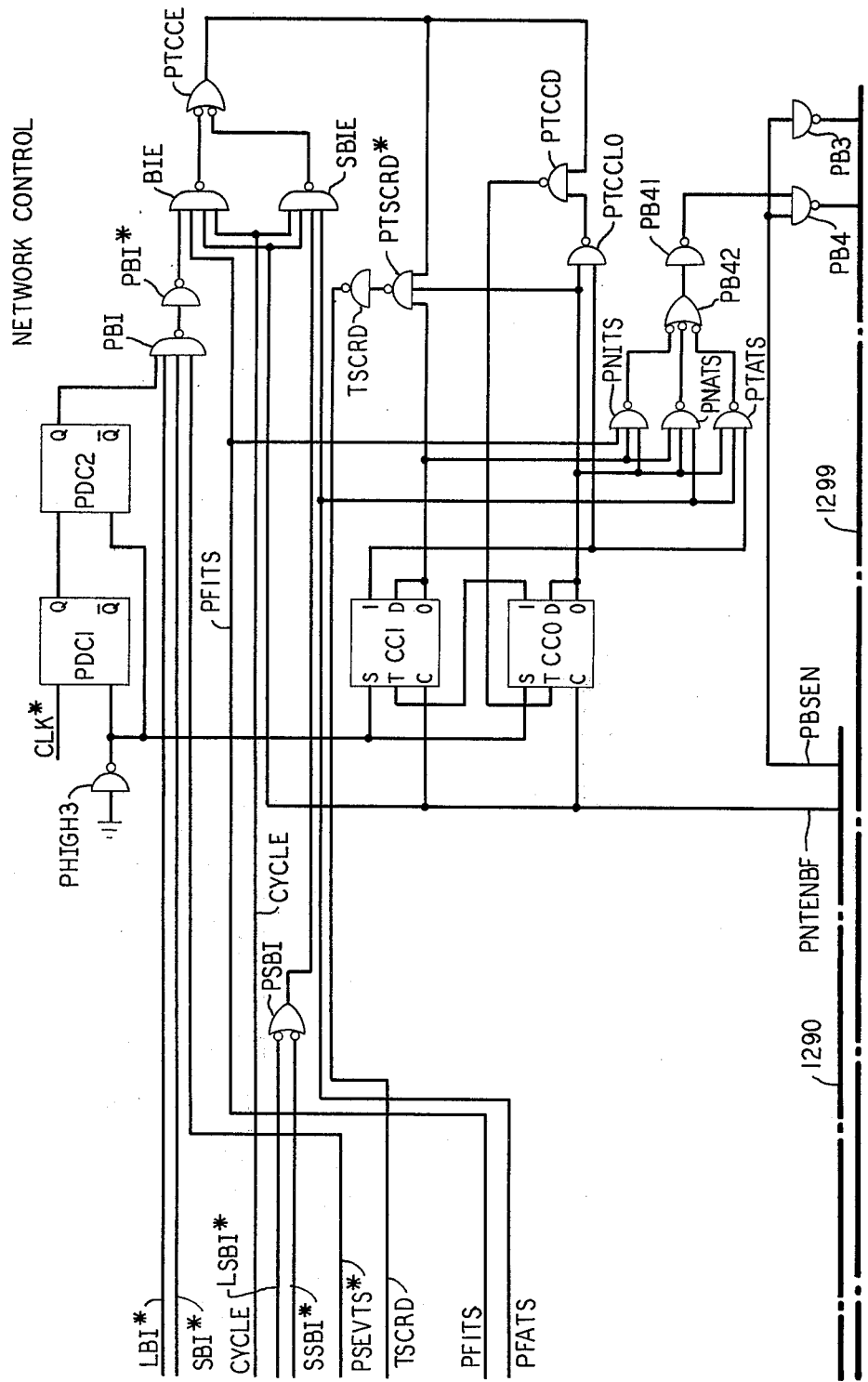

Description of the Network Controller (FIGS. 6 and 10)

The network control circuitry shown in FIGS. 6 and 10 contains the logic necessary to accept commands from the main controller FIG. 12 and sequencer 1120, FIG. 11, so that specific ports may be connected to or disconnected from the communications bus, so that idle time slots may be identified, and so that the existence of specific connections can be verified in the network. A record of the busy/idle state of network ports is, as mentioned previously, kept in activity memory 1101 in FIG. 11 which is divided into two sections, a station activity section and a line or service activity section. Each word in the line or service activity section stores the current activity of a line (or service) and the number of the station controlling that line or service, i.e., the number of the station to which the line is connected. The line activity word shows that a line is idle when the line activity code (stored in the LSAB), of the word is all 1's. The activity word for a line is addressed using the LSSB of the line's corresponding button word obtained from service assignment memory 1110.

When the network controller is employed by the main controller to establish or to disconnect a port circuit connection to the time division communication bus, the main controller, via sequencer 1120 and cable 1290, furnishes a time slot number to match register 602 and applies a time slot writing or clearing command to decoder 600. The main controller desires that the writing or clearing take place in the port circuit shift register during time slot identified by the 7-bit time slot number entered into match circuit 602. The clock driving time slot counter 601 in the network controller and the clock driving the port circuit shift registers such as port shift registers 102 of station circuit 3, FIG. 2, are in synchronism.

The function of match circuit 602 in the network controller is to match the time slot number furnished it by the main controller against the count accruing in time slot counter 601 and then to generate signals to load or clear port circuit shift registers. The match signal which circuit 602 provides on lead PTSMTCH can only occur at exactly the proper time slot count. It is, however, a characteristic of certain shift registers, including the ones utilized in the port circuits of the present embodiment, that a write or clear control command must be present just before the clock signal arrives. It is therefore not possible for the match signal to be generated by circuit 602 before the port circuit shift register receives the clock signal. In this manner though the port circuit shift registers and time slot counter 601 receive the same clock signal, the port circuit shift registers cannot be loaded on the same clock pulse that generates the match signal on lead PTSMTCH and so must be loaded or cleared one time slot later than the actual time slot number appearing in match circuit 602.

This discrepancy between the time slot count in match circuit 602 and that in the port circuit shift registers does not, of course, affect the accuracy of communications connections established in the time division switching network and does not cause any difficulty because neither activity memory 1101 nor the main controller, FIG. 12, keeps any record of the actual time slot number during which active stations and lines are interconnected by the time division communications bus. Since no time slot assignment memory need be provided, the size of activity memory 1101 need not be as great as in conventional time division switching systems. However, it is necessary from time to time for the main controller to find which time slots on the time division bus are idle so that an idle time slot can be selected to establish a connection between a line and station. Having determined the number of an idle time slot, the main controller must then furnish this number to the network controller so that a bit identifying the time slot may be loaded into the port circuit shift register of the line and of the station circuit between which interconnections are to be established. It is of course essential that the correct time slot be loaded.

When the main controller has obtained the number of an idle time slot from the network it instructs the network that this time slot number shall be seized for use to establish a time division network connection between the particular line and station by furnishing the time slot number to match circuit 602 of the network controller. It would of course be possible for match circuit 602 to be equipped with a down counter to immediately reduce by one the time slot number furnished it by the main controller so that the port circuits would be accessed early enough to permit the write or clear control command to be present before the correct clock signal arrived. Providing the match circuit with a down counting arrangement, however, involves the furnishing of a considerable amount of additional circuitry, making the match circuit unnecessarily expensive. In the illustrative embodiment, therefore, the match circuit 602 is not provided with a down counter and time slots are loaded into the port circuit shift registers one time slot count later than the actual time slot count furnished by the main controller. However, to compensate for the discrepancy between the time slot count of the actual network connection and the time slot count dictated by the main controller, a down counting arrangement is provided in the network controller as part of a mechanism which reports to the main controller the count accruing in the network when the network is interrogated. It is thus possible to compensate for the discrepancies in time slot counts without adding any great amount of circuitry to that otherwise required merely for reporting the existence of idle or active time slots themselves.

Assuming that when the network in interrogated the time slot count accruing in counter 601 is entered into time slot register 605 in parallel, the contents of register 605 may conveniently be down-counted when gate DNC is enabled. The internal circuitry necessary to make register 605 down-count may be implemented in any of several well known manners. For example, register 605 may include a number of stages each having a D-toggle flip-flop. Each stage is normally set at the start of a cycle. The stages are selectively individually reset in accordance with the particular count furnished from time slot counter 601. Down-counting may conveniently be provided by permitting a clock pulse to toggle the least significant stage of the register at the end of the cycle during which a time slot count would be entered into register 605. Gate DNC provides this down-counting enabling input to register 605 at the end of the cycle prior to register 605 furnishing its contents to the main controller.

Assuming that all of the flip-flops defining the stages of register 605 were set to 0 and the least significant (first) stage was toggled by the output of gate DNC, the output of the first stage would go high and toggle the next stage which in turn would toggle its succeeding stage and so on. Accordingly, the output of gate DNC would toggle register 605 to the all-1s state. If register 605 had had all of its stages initially set to the all-1s condition and the output of gate DNC provided a toggle, the least significant stage of register 605 would be switched to the O state. The toggling of the first stage of the register under these circumstances would not be repeated throughout succeeding stages inasmuch as its output going from the 1 to the 0 stage would not be effective to toggle the second stage. This, however, is exactly what is desired since the time slot count number that is one less than the binary all-1s state is a state in which all except the least significant stage of register 605 is set to binary 1.

Finding Idle Time Slots

When the main controller desires to establish a network connection it must first determine whether an idle time slot exists during which the connection can be set up. To do so, command generator 1220 in the main controller places a find-idle-time-slot command on system data bus 1299 which is applied through sequencer 1120 to cable 1290 and received in decoder 600 of the network control. Responsive thereto decoder 600 energizes lead PFITS. The energization of lead PFITS primes gate BIE in FIG. 10. Gate BIE monitors the station busy/idle bus SBI* and the line busy/idle bus LBI* during the active interval of the time slot. The active interval of the time slot is defined by 1-shot circuits PDC1 and PDC2 which provide 200 and 100 nanosecond delays, respectively, from the onset of the clock pulses. The state of busy/idle buses SBI* and LBI* is reported to gate PBI together with the control signal on lead PSEVTS*. (The control signal on lead PSEVTS* will be described hereinafter.) The output of gate PBI inverted by gate PBI* is applied to the uppermost input of gate BIE. If all of the inputs of gate PBI are high during a particular clock pulse, gate PBI produces a low signal at its output to indicate that the time slot occurring on that particular clock pulse is an idle time slot. Gate PBI* inverts the low signal and applies a high signal to the upper-most input of gate BIE.

As noted previously, the station and line busy/idle buses SBI* and LBI* exhibit a low signal condition during the active interval of a time slot that any port circuit is caused by its port circuit shift register to be connected to the time division communications bus. To provide a degree of protection against a circuit permanently maintaining its busy/idle bus in the low signal condition, the time slot is provided with a guard interval. Thus, while the port circuit shift register is permitted to apply a low signal to the busy/idle bus during the active portion of the time slot, it is prevented from doing so, when properly operating, during the guard interval of the time slot, FIG. 10 the circuitry at the input of gate BIE is provided for monitoring the signal state of the station busy/idle bus SBI* and of the line busy/idle bus LBI*. Delay gate PDC1 receives the time slot defining clock pulses appearing on lead CLK*. The delay of gate PDC1 is adjusted so that its output Q produces a high signal condition at the moment (illustratively 0.2 microsecond) after the onset of the time slot when a low signal condition, considering the round trip delays from the main controller to the port circuits, could be applied by a port circuit to its associated busy/idle bus and for the busy idle signal to appear at the circuitry of FIG. 10. The high signal at the output of delay gate PDC1 triggers 1-shot circuit PDC2 to produce a high signal at its Q output which persists only for a portion (illustratively 100 nanoseconds) of the active interval (illustratively 200 nanoseconds) of the time slot. thus, gate PBI is enabled only during the active interval of the time slot to monitor the state of busy/idle buses LBI* and SBI*.

Selecting Even Time Slots

Time slot counter 601 in FIG. 6 counts the clock pulses applied to it on lead CLK. These pulses are in synchronism with the clock signals that advance the line and station port circuit shift registers (see FIGS. 1, 2, and 7) to define the intervals during which the port circuits may be connected to the time division communication bus. Assuming that the system is being set into operation for the first time, all time slots may be assumed to be idle. While any practical time division switching system will be constructed in accordance with sound engineering practices so as to reduce crosstalk between adjacent time slots, it is possible in accordance with one aspect of the illustrative embodiment to provide an even further margin against crosstalk when the time slots are relatively lightly loaded. In accordance with this aspect of system operation, the network control will initially assign only even numbered idle time slots for connections until all even-numbered time slots have been assigned. During this phase of system operation, there will be one unused time slot acting as an additional guard interval between each active connection thereby providing an additional degree of crosstalk protection.

To achieve the assignment of initial connections to even numbered idle time slots, the circuitry in FIG. 10 which is responsible for detecting idle time slots in the time division communications network is prevented from detecting any idle odd-numbered time slots during the scanning of a first cycle of time slots in the following manner.

The time slots governing the intervals during which time division connections may be established in the switching network are counted by time slot counter 601. Incident to the end of a cycle of time slot counting, counter 601 will produce an all-1s output activating gate PBCYLI. The activation of this gate produces a low signal which toggles flip-flop PBCYL via inverter PBCYLT and prevents the toggling of flip-flop PSEVTS until the beginning of a new cycle of time slot counting. At the beginning of a new cycle of counting the output of gate PBCYLI goes high and toggles flip-flop PSEVTS. When flip-flop PSEVTS is toggled to the set state only those time slots found to be idle in the network and which are even-numbered will be selected for assignment to new connections. The set state of the select-only-even-time-slots flip-flop PSVETS together with a high signal from inverter PTSBO* enable gate PSEVTS to apply a low signal on gate PSEVTS*. The low signal on lead PSEVTS* forces gate PBI to indicate that the time slot then accruing is busy even if in fact the time slot were actually idle. Inverter PTSBO* produces a high signal at its output whenever its input which is connected to the least significant digit output lead of time slot counter 601 is in the low signal condition indicating the occurrence of an odd-numbered time slot.

Flip-flop PSEVTS is cleared by the application of a low signal to its C input. The continuous high signal applied to the S input of flip-flop PSEVTS by gate RHI has no effect, the connection to gate RHI being merely to eliminate noise. Whenever any of the inputs to AND gate PCSEVTS exhibits the low signal condition, the output of gate PCSEVTS goes low and clears flip-flop PSEVTS. Whenever the least-significant digit entered into register 605 is a 0 and whenever the cycle flip-flop PBCYL is reset, flip-flop PSEVTS will be reset.

When an idle time slot is found, the circuitry of FIG. 10, as will hereinafter be described in more detail, activates lead TSCRD to enable gate 604 to enter the time slot count then accruing in counter 601 into time slot register 605. So long as flip-flop PSEVTS is set the time slot number furnished register 605 must be an even-numbered time slot. For even-numbered time slots an output derived from the least significant stage of shift register 605 partially primes gate PCSEVTS for the resetting of flip-flop PSEVT. Gate PCSEVTS will be fully enabled to clear the select-only-even-time-slots flip-flops PSEVTS by the set output of cycle flip-flop PBCYL. Flip-flop PSEVTS will be cleared when an idle time slot is found during the first cycle or at the end of the first cycle if no even time slot is found. Accordingly, during the second cycle of time slot counting an odd time slot may be selected.

In terms of the illustrative embodiment where 128 time slots may be assigned to establish communications connections in the time division communications bus, time slot register 605 will be a seven stage register in which the state of the least significant stage indicates whether an even or an odd-numbered time slot is being counted. When an odd-numbered time slot is being counted, this stage provides a signal which enables the upper-most input of gate PCSEVTS.

In addition to toggling the aforementioned flip-flops, the activation of gate PBCYLI also sets the delayed end-cycle flip-flop PBCDE consisting of cross-coupled NAND gates PBCDE1 and PBCDEO. The setting of the delayed end cycle flip-flop assures that lead PBCDE will be energized throughout a complete cycle for the enabling of logic circuit 607. Logic circuit 607 when enabled converts the decoded commands from the main controller into signals that are applied to buses MS, WS, ML and WL for loading and clearing the line and station port shift registers.

Network Auditing

Figure 13:
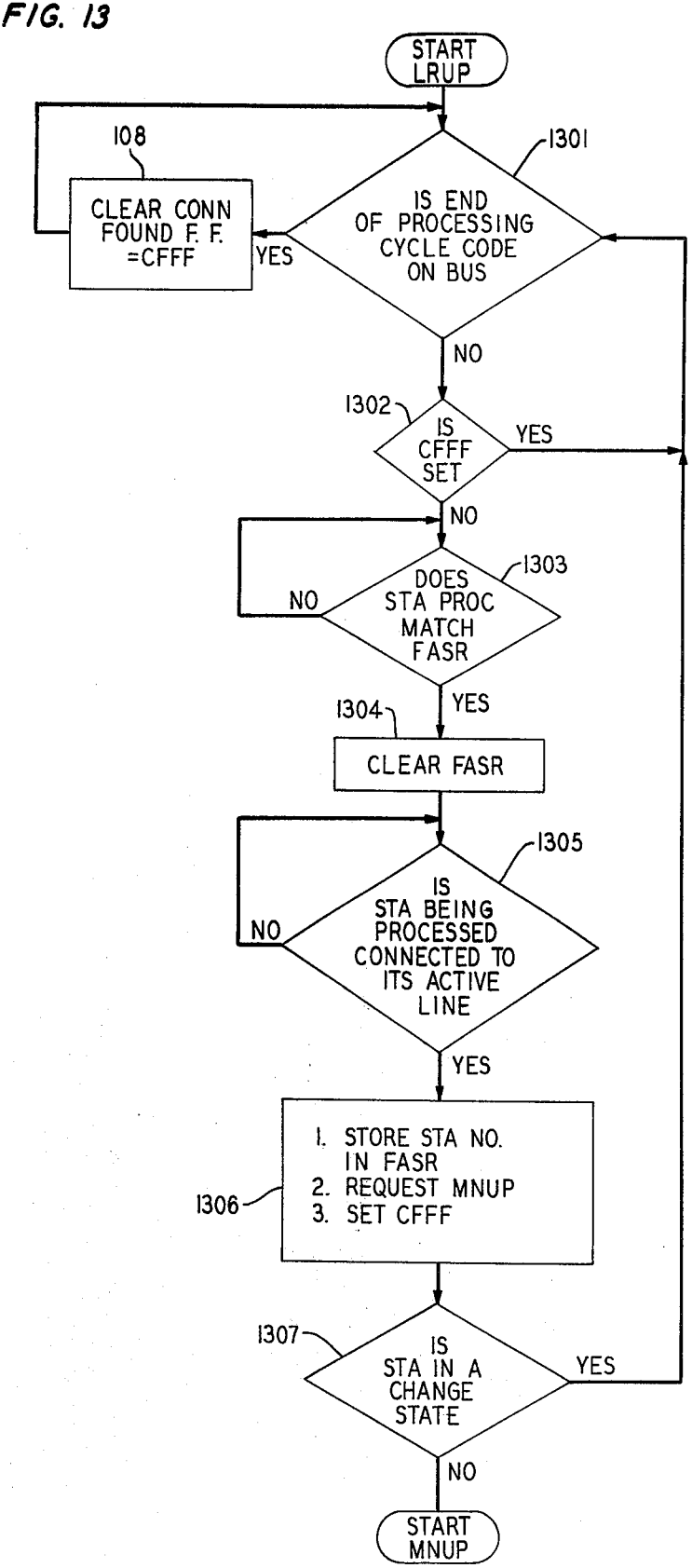
FIGS. 13, 14, 15A and 15B show flow diagrams for auditing network connections.
Figure 14:
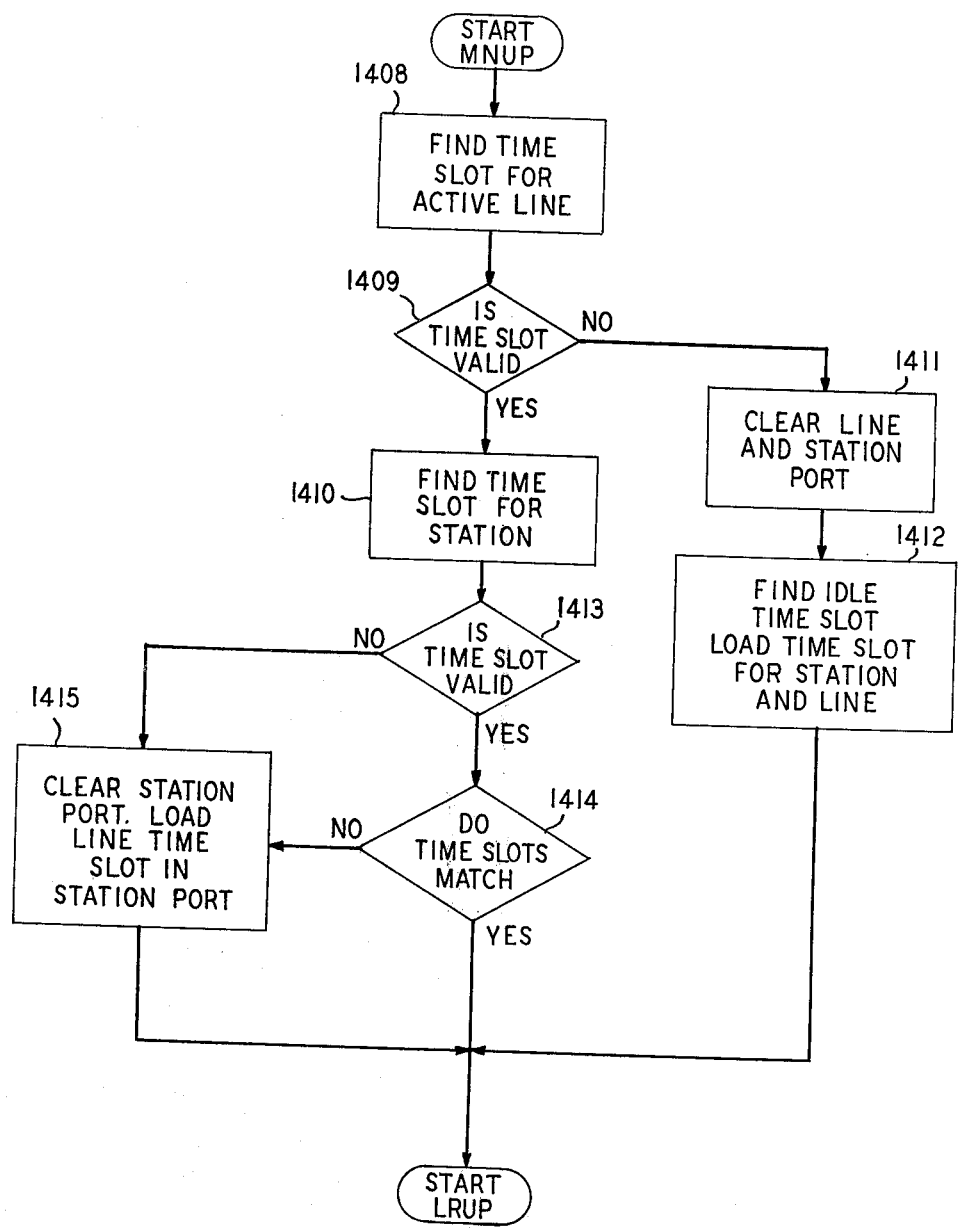
Figure 15A:
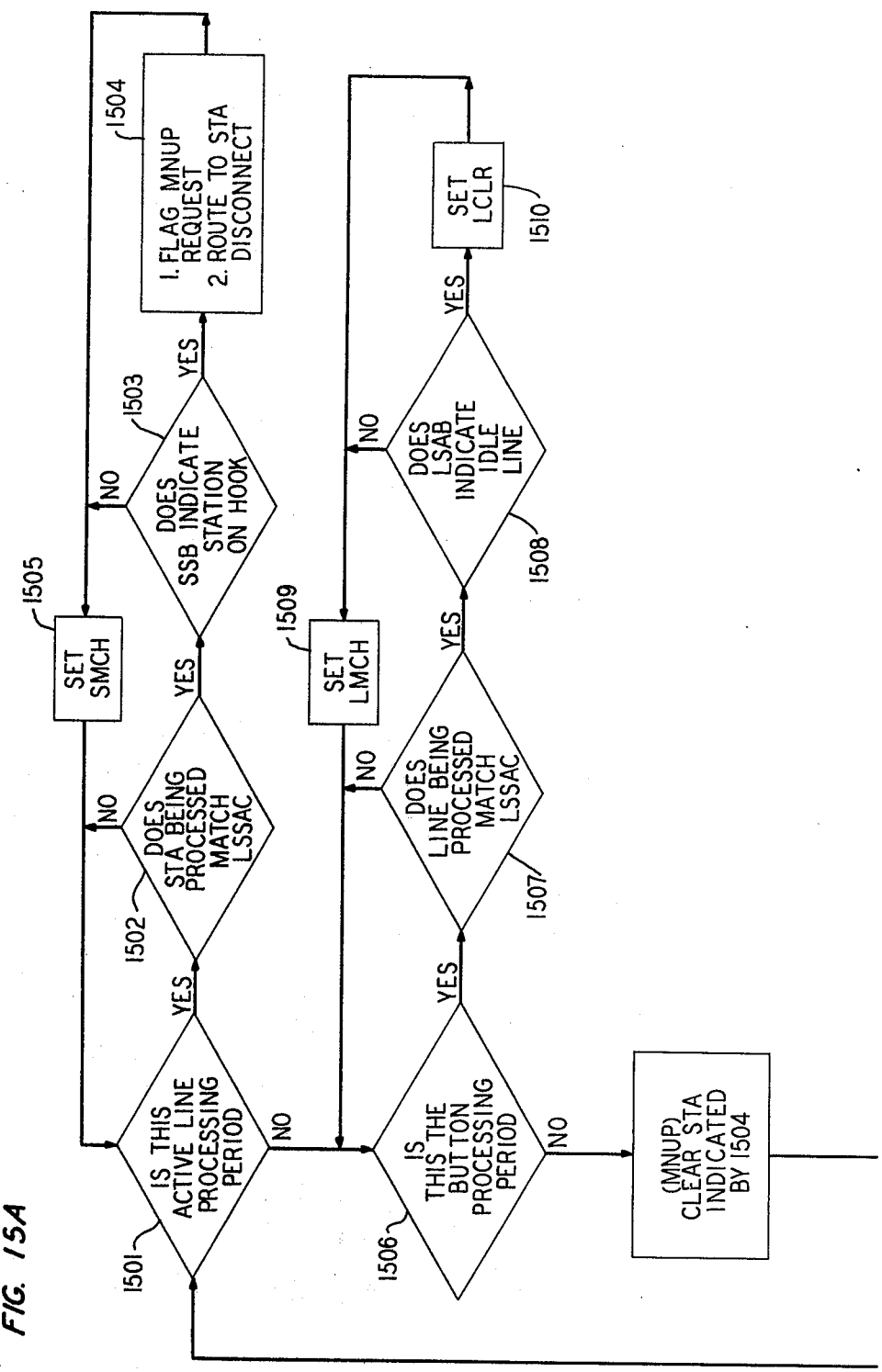

Because there is no possibility of establishing a "hard wire" connection between a station and line in the time division communication network of the illustrative embodiment, it is advisable periodically to interrogate the network to determine if ports which are shown as being connected in activity memory 1101 are indeed properly connected in the network. Two modes of auditing network connections are normally employed. The detailed logic for executing the two forms of network connection auditing is shown in FIGS. 6, 10, 13, 14, 15 and 15A. A "fast" audit shown in FIGS. 13 and 14 is performed by the network control logic to verify only active connections, one such connection being verified each 25 milliseconds. The time required to verify all current network connections during the fast audit is dependent upon the number of assigned time slots. Thus, if all 128 time slots are busy, all 128 connections would be verified in approximately 3 seconds. The second or "slow" mode of auditing network connections is shown in FIGS. 15 and 15A and audits all station and line ports in the network. In the key system network of the illustrative embodiment, it is possible to equip 512 stations and/or 512 lines or any lesser amount thereof. Only a fraction of the equipped ports are normally busy. In the slow audit mode, line and station numbers are processed in sequence, one number being processed during each 25-millisecond scan. If the line or station or both being audited are idle or unprogrammed, they are cleared in the network. This auditing procedure provides a constant updating of the network connections based on the relevant bytes of activity memory 1101. False network connections existing because of any malfunction should thus only persist for a few seconds before being cleared by one of the two auditing modes of operation.

Fast Network Audit

Referring now to FIGS. 13 and 14 there are shown the details of the fast audit logic of the memory update and network control 1280 (FIG. 12). Sequencer 1120 (FIG. 11) applies an end-of-processing code on system bus 1299 every 25 milliseconds following processing of all stations. If the end-of-processing-cycle code appears on data bus 1299, logic block 1301 (FIG. 13) clears connection-found flip-flop 1282. Let it be assumed that a new cycle has just begun after an end-of-processing-cycle code has disappeared from station bus 1299. Logic block 1302 tests to ascertain that the connection-found flip-flop 1282 is not set indicating that an active connection has not yet been found in the current audit. If the connection-found flip-flop had been found to be set, logic 1301 would be reset to await the appearance of the next end-of-processing-cycle code on bus 1299 at which time the connection found flip-flop CFFF would be reset. In the illustrative embodiment only one active connection is audited during each 25 millisecond scan.

If logic 1302 detects that the connection-found flip-flop 1282 is not set, logic 1303 is activated to await the processing of the station whose number is contained in fast audit station register 1281. When the number of the station being processed matches the number in register 1281, logic 1303 activates logic 1304 to clear register 1281. The number in register 1281 just cleared is the number of the station that was audited during the last scan. After the clearing of the fast audit station register, lamp and ring update processing of the current station continues.

The function of logic 1305 is to detect an off-hook station that is connected to its active line. It does so by obtaining the switchook status byte SSB and the active line number byte ALNB from data storage register 1230 of the main controller. When logic 1305 detects that the station being processed is one which is connected to its active line it activates logic 1396 to store that station's number in the fast audit station register 1281. Logic 1306 sets connection-found flip-flop 1282 and prepares a request to the main controller to activate logic 1408 during the memory update and network control interval (MNUP), FIG. 14, to find the time slot actually assigned the active line in the network thereby to verify whether the network reflects the condition specified by the activity memory information. In addition logic 1306 activates logic 1307 to test the VB of the station activity word to ascertain that a change of state has not occurred at the station so that logic 1408 may be operated during the memory update and network control period. If the station has a change of state, the audit logic does not attempt to verify the connection at this time.

Figure 13A:
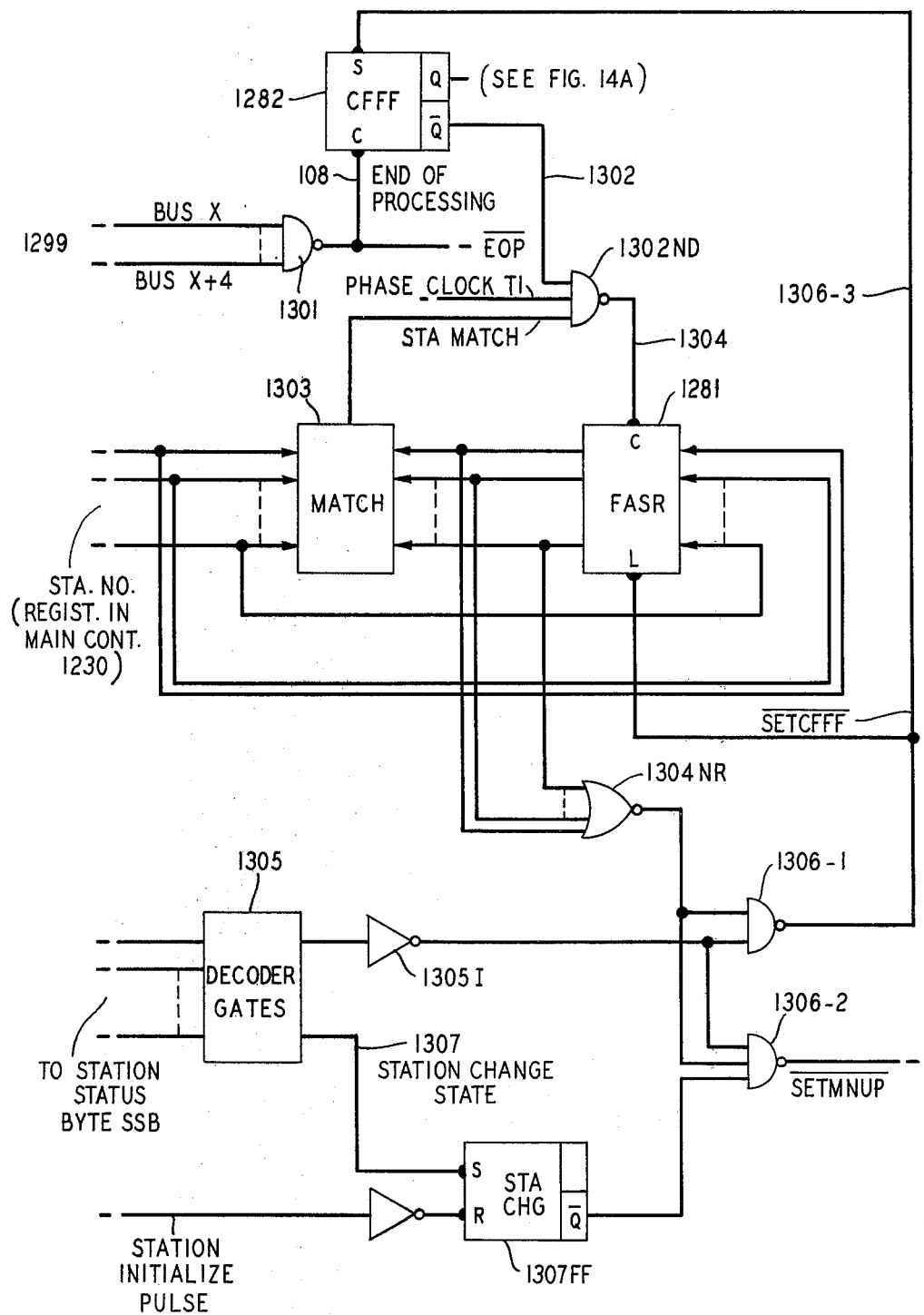

The foregoingly described operations of FIG. 13 may be more clearly understood by referring now to FIG. 13A. In FIG. 13A, there is shown the detailed connections of the gates and other circuitry of the memory update and network control 1280 (FIG. 12) which are involved when the apparatus of FIG. 13 operates to perform its portion of the fast network audit. The circuit elements of FIG. 13A have been numbered to correspond to the numbering scheme employed in FIG. 13. (Similarly, the circuit elements of FIGS. 14A and 14B have been numbered to correspond with FIG. 14, and the elements of FIGS. 15C and 15D have been numbered to correspond with the numbering scheme employed in the slow network audit of FIGS. 15A and 15B. Rather than complicate the drawing of FIGS. 13A, 14A, 14B, 14C, 15C, and 15D with inter-figure cabling, a few of the circuit elements such as the CFFF flip-flops which are employed in more than one of the figures have been shown redundantly in each of FIGS. 13A and 14A. It will be apparent, from the notation on the drawing, that there need be provided only one such CFFF flip-flop. (Similarly, the MNUP flip-flop is shown redundantly in FIGS. 14A and 15C.)

Referring now to FIG. 13A, NAND gate 1301 looks for the appearance of the end-of-processing code on system bus 1299. Gate 1301 places a low signal on its lead $\overline{EOP}$ when all of its inputs which are connected to bus 1299 are placed in the high signal condition by the appearance of the end-of-processing code on bus 1299. The low signal on lead $\overline{EOP}$ is applied via lead 108 to the clear input of connection-found flip-flop CFFF 1282 clearing the flip-flop and causing its $\overline{Q}$ output to go high. The high signal at the $\overline{Q}$ output of flip-flop 1282 is applied to lead 1302 at the upper input of NAND gate 1302ND partially enabling the gate. Thus, gate 1302ND is partially enabled by the CFFF being placed in the reset state. Gate 1302ND will be fully enabled during clock phase T1 of the lamp and ring update interval (see FIGS. 16A, 17A, and 18A) when match circuit 1303 detects that the number of the station then being processed matches the number in the fast audit station register FASR, 1281. Presently, FASR 1281 contains the number of the station which was audited during the previous 25-millisecond cycle. Match circuit 1303 has its left-hand inputs connected to receive the station number from the station number register of data storage registers 1230, FIG. 12. The right-hand inputs of match circuit 1303 are connected to the outputs of the fast audit station register 1281, shown also in FIG. 12.

When the number of the station being processed matches the number that had been priorly loaded into the FASR, match circuit 1303 fully enables NAND gate 1302ND activating lead 1304 to clear FASR 1281 and prepare it to receive the number of the next active station to be audited. When FASR 1281 is cleared, all of its outputs are in the low signal condition causing NOR gate 1304NR to provide a high signal which partially enables NAND gates 1306-1 and 1306-2. Gate 1306-1 will be fully enabled only when decoder gate 1305, which reads the station status byte SSB of the station activity word of activity memory 1101, FIG. 11, is enabled by a station status byte that indicates that the station being processed is connected to its active line. This is then the next active station to be audited.

Decoder gate 1305 produces a low signal output when it reads the SSB code indicative of a station being processed which is connected to its active line. This low signal is inverted by inverter 1305I and is applied as a high signal to the lower input of NAND gate 1306-1. Gate 1306-1 is enabled at this time and provides a low signal to activate the load input of FASR 1281. FASR 1281 receives at its right-hand inputs the information from the station number register of data storage register 1230 which now contains the number of the station being processed and which has been identified by decoder 1305 as being a station which is connected to its active line.

As mentioned previously the station status byte SSB also contains a bit to indicate when the station is in a change-of-state. In the event that decoder gate 1305 senses a change-of-state code in the SSB it will set flip-flop 1307F/F whose $\overline{Q}$ output prevents gate 1306-2 from being fully activated. Assuming that the SSB indicates that the station is not in a change-of-state, flip-flop 1307F/F will remain reset and gate 1306-2 will be fully activated before and until the number of the new active station to be audited has been entered into FASR 1281. The activation of gate 1306-2 sets flip-flop MNUP shown in FIGS. 14A and 15C. Accordingly, the circuitry of FIGS. 13 and 13A sets the stage for the operation of the circuitry of FIGS. 14, 14A, and 14B.

The main controller enters the memory update and network control interval MNUP, FIG. 14, after a station's last button has been processed during the button processing period when enabled by sequencer 1120. During the time it is enabled for this purpose, the main controller generates commands to change connections in the network and to update the station line and service activity memories. When the main controller has finished its tasks, it generates an exit command and then waits until the processing of the next station begins.

In the fast network audit routine of the present embodiment, logic 1408 will be activated during the memory update and network control interval for the station currently being processed. Logic 1408, when activated, causes the network controller to report the actual time slot assigned to the active line of the station that was selected for auditing by logic 1305. The time slot assignment is obtained by the main controller issuing a find active time slot command (FATS) to the network controller in response to which the network controller monitors the line selected busy-idle bus LSBI- associated with the group of line ports which includes the active line. The line port shift register 102 shown in FIGS. 1 and 2 for the active line will cause the LSBI- to exhibit a low signal condition during the time slot when the line port is connected to the time division communications bus. The number of the active line employed by logic 1408 appears in the ALNB of the station activity word of the station selected for auditing by logic 1305. The active line number is transferred from the data storage registers 1230 of the main controller, FIG. 12, to sequencer 1120 and entered into interface register 500, FIG. 5, which addresses the line by selecting the line centerboard, FIG. 8, serving the group of lines which includes the active line and by applying the appropriate designating code to leads BO-5 to the decoders in the centerboard to address the line itself.

Finding the Active Time Slot

Logic 1408 causes command generator 1220 to issue a find active time slot command on system data bus 1299. Sequencer 1120, FIG. 11, receives the command on bus 1299 and applies it over cable 1290 to the network controller, FIG. 6. Decoder 600, FIG. 6, receives the command and generates an output on lead PFATS. Lead PFATS when activated initiates a sequence of operations to find the active time slot assigned to the port circuit being accessed by the number supplied to interface register 500, FIG. 5. The activation of lead PFATS provides a signal to prime gates SBIE, PTATS, and PNATS in FIG. 10. Gate SBIE will have been pre-primed by the activation of lead PNTENBF from the main controller at the beginning of network audit and by a timing signal on lead CYCLE applied by the output of flip-flop PBCYL, FIG. 6, at the beginning of a new frame of time slots. The signal on lead PNTENBF clears counting flip-flops CCO and CC1.

When the line port shift register of a line selected as previously described delivers its single circulating bit at its output to define the time slot during which that line port is connected to the time division communications bus, the selected port circuit will cause its associated bus LSBI* to exhibit a low signal condition. The low signal appearing on bus LSBI* is applied to the upper input of gate NAND PSBI FIG. 10 causing a high signal at the output of this gate. The high signal at the output of gate PSBI fully enables NAND gate SBIE. The activation of gate SBIE applies a low signal to gate PTCCE which, in turn, applies a high signal to gates PTSCRD* and PTCCD.

Assuming that this is the first active time slot that has been detected in the cycle, counting flip-flops CC0 and CC1 will be reset providing high signals on their "0" outputs to the left hand and center inputs of gate PTSCRD*. Gate PTSCRD* upon receiving the high signal from gate PTCCE provides a low output which is inverted by gate TSCRD and applied to lead TSCRD as a high signal to cause gate 604 in FIG. 6 to enter the 7-bit time slot number accruing in time slot counter 601 into time slot register 605. The contents of time slot register 605 will be decremented by one and then returned to the main controller FIG. 12 on command by sequencer 1120 as the time slot number assigned to the active line of the station being audited.

Verifying Time Slot Validity

The validity of the active time slot thus entered into time slot register 605 is verified by logic 1409 as follows: The high active signal appearing at the output of gate PTCCE, FIG. 10, during the active time slot becomes a low signal after the end of the time slot. The output of gate PTCCD then goes high to toggle flip-flop CC0 to record the fact that a first active time slot has been found for the active line port being audited. Accordingly, at the end of the first time slot found to be active, flip-flop C0 has been toggled to the set state producing a high signal at its "1" output and a low signal at its "0" output. Flip-flop CC0 then toggles flip-flop CC1 and the "0" output of flip-flop CC1 goes low inhibiting any further operation of gate PTSCRD* during the current frame of time slots.

At the end of the current network operation, sequencer 1120 energizes lead PBSEN priming gate PB4. Gate PB4 should receive a high signal from gate PB41 if one and only one active time slot has been found during the cycle in which case gate PB4 upon receiving a signal from lead PBSEN applies a low signal to lead PB4 to inform the main controller that a valid time slot assignment was found. Gate PB4 will have a low signal applied at its input in the event that gates PNATS or PTATS are enabled during the cycle to indicate respectively that no active time slot has been found or that two or more active time slots have been found. Gate PNATS will be enabled when its three inputs all receive high signals. The lower-most input of gate PNATS normally receives a high signal from lead PFATS. The center-most and upper-most inputs of gate PNATS will receive high signals from the "0" outputs of flip-flops CC0 and CC1 if these flip-flops have not been toggled by the detection of the first active time slot during the cycle. On the other hand, gate PTATTS will have all of its inputs in the high signal condition in the event that two or more active time slots have occurred during the cycle. The center input receives a high signal from lead PFATS. The lower-most input of gate PTATS receives a high signal from the one output of flip-flop CC1 after the end of the first detected active time slot. If a second active time slot should be detected, flip-flop CC0 will be toggled to the "0" state and its "0" output will apply a high signal to the upper-most input of gate PTATS fully enabling this gate.

In the event that logic 1409 determines that the time slot assigned to the line being audited is not valid either because no time slot has been assigned to the line port or because two or more time slots have been assigned, it will return a task-not-complete code, i.e., a high signal on lead PB4 and a low signal on lead PB3, to the system data bus. The audit logic in memory update and network control 1280 in the main controller FIG. 12 receives the task-not-complete code and controls command generator 1220 to apply a clear shift register command on system data bus 1299. Decoder 600 in FIG. 6, receives the clear shift register command and, in response thereto, activates lead CLSR. Activation of lead CLSR causes circuit 607 to maintain WRITE lead WS in the low signal condition throughout the cycle causing the shift register in the port circuit selected by the main controller to be cleared.

After logic 1411 has cleared the line and station port circuit shift registers responsive to the CLSR command, logic 1412 is activated to generate a find-idle time slot command and then to load the port circuit shift registers for the line and station ports with a bit which will assign the idle time slot to these ports. Logic 1412 causes the main controller to send a find-idle time slot command to decoder 600 via system data bus 1299, sequencer 1120 and cable 1290.

Logic 1410 is next activated to find the time slot assigned to the station being audited. The number of the station being audited is entered into interface register 500 and the port circuit for the station being audited is selected. When the station port shift register for the active station delivers the time slot defining bit to its output, bus SBI- will exhibit the low signal condition. The low signal appearing on lead SSBI- is applied to gate SBI appearing as a high input at its output and at the input to NAND gate SBIE. In similar fashion to the manner in which logic 1409 tested the validity of the time slot for the active line, logic 1413 tests the validity of the time slot assigned to the station being audited. When the time slot assigned to the station being audited is detected, lead TSCRD is energized to exhibit a high signal condition and the time slot count accruing in counter 601 FIG. 6 is time slot shift register 605 by gate 604. The time slot number, decremented by one, is returned to the main controller over system data bus 1299 when sequencer 1120 energizes lead DNC. This time slot number is compared in the main controller with the time slot number previously obtained for the active line. In the event that the time slot numbers do not agree, memory update and network control 1280 controls decoder 600 to produce the CLSR command.

In the event that the station and line time slots do not agree the main controller issues the CLSR command which is received by decoder 600 in FIG. 6. Simultaneously, the main controller furnishes the time slot number which is to be cleared to match circuit 602. Decoder 600 energizes lead CTTS and gate PCTTS is enabled when match circuit 602 detects that time slot counter 601 has arrived at the number of the time slot which is to be cleared. Logic circuit 607 energizes leads MS and WS for the station ports and leads MS and WL for the line ports to cause all of the ports to clear their shift registers of the designated time slot.

Figure 14A:
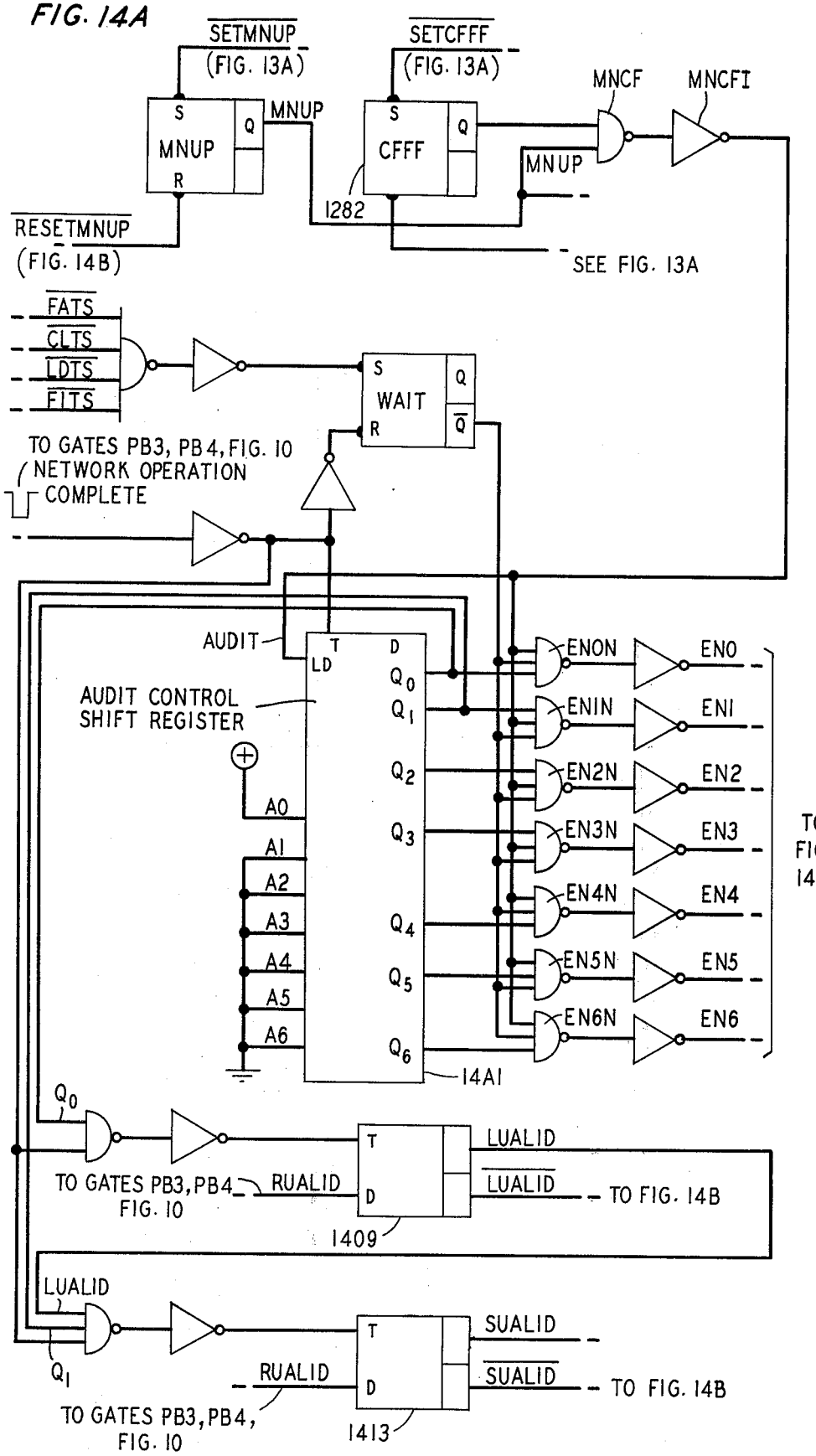
Figure 14B:
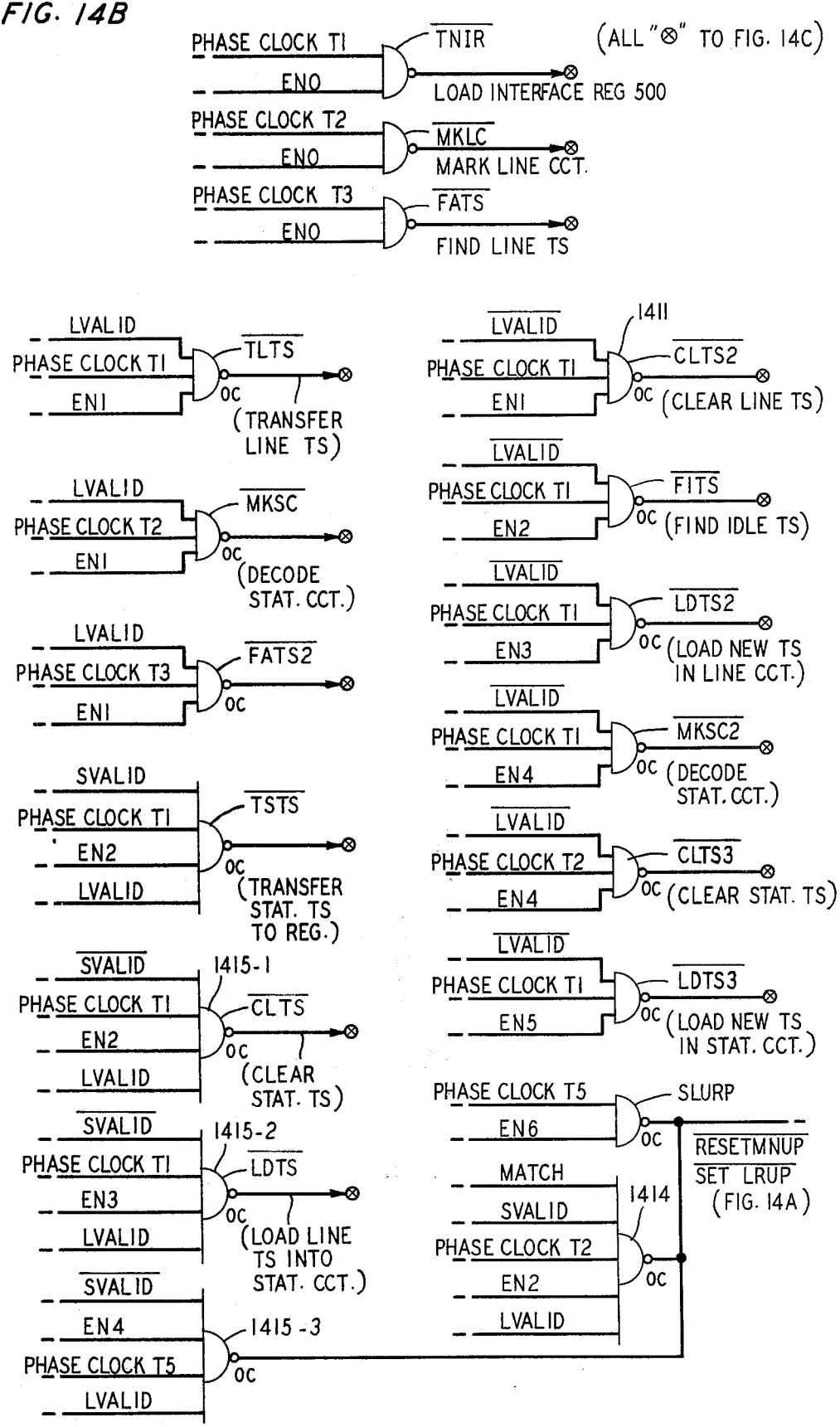

Referring now to FIGS. 14A, 14B and 14C, there are shown the gates and other elements of memory update and network control 1280 that are called into operation by the previously described apparatus of FIG. 14.

The fast audit operations of FIG. 14 are performed under the control of the fast audit control shift register 14A1 shown in FIG. 14A. This shift register has seven output stages Q0 through Q6 which control seven enabling leads EN0 through EN6. When lead EN0 is enabled (as will hereinafter be described) at the start of the MNUP portion of the fast audit, gates $\overline{\text{TNIR}}$, $\overline{\text{MKLC}}$ and $\overline{\text{FATS}}$ shown in FIG. 14B are sucessively activated during phase clocks T1, T2, and T3. This enables the first part of the fast audit to find the time slot assigned in the network to the active line. More specifically, when gate $\overline{\text{TNIR}}$ is enabled during phase clock T1, it places a low signal at a corresponding code point of FIG. 14C which code point is cross-connected to a pattern of code generating NAND gates 14C1 through 14CN. There are as many of NAND gates 14C1 through 14CN as there are leads in bus 1299 necessary to encode all of the codes listed in FIG. 14C. When a code point has a low signal applied to it, it causes each of the NAND gates to which it is connected to develop a high signal at its respective output. This high signal will enable a respective open-collector bus driver gate associated with a specific lead in bus 1299 when the bus driver gates are enabled with a bus enable (high) signal from sequencer 1120. For present purposes, sequencer 1120 may simply be considered as any form of prior art finite state machine which generates the waveforms identifying the station line and button processing shown respectively in FIGS. 16A, 17A, and 18A.

Figure 9:
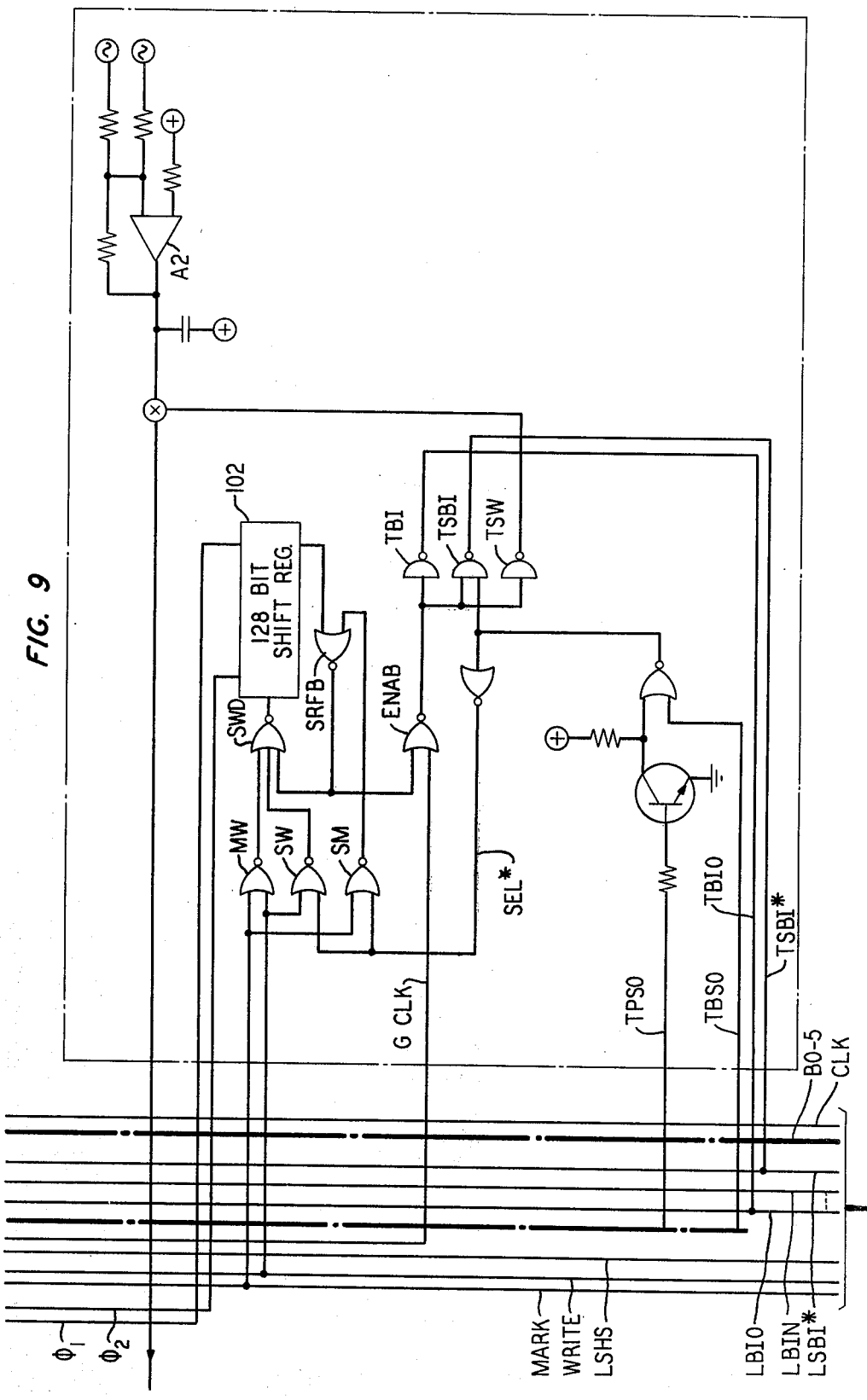
FIG. 9 shows a tone trunk.

The code applied to bus 1299 by the enabling of gate $\overline{\text{TNIR}}$ during phase clock T1 causes the main controller to transfer the contents of data storage registers 1230 containing the numbers of the station being processed and of the active line that is connected to that station into the network interface register 500, FIG. 5, via bus 1299. The entry of the line number onto interface register 500 permits the decoders 801, 802 FIG. 8 to address (when gate $\overline{\text{MKLC}}$ is enabled) a line port circuit of FIGS. 7 through 9. The entry of the station number into interface register 500 will later permit the decoder associated with leads B6-8 in FIG. 5 and decoders 301, 302 (FIG. 3) associated with leads B0, B1, and B2-B5 and GRP- to address (when either gate $\overline{\text{MKSC}}$ or $\overline{\text{MKSC2}}$ is enabled) a station port circuit in one of FIGS. 1 through 4.

During phase clock T2 gate $\overline{\text{MKLC}}$ FIG. 14B is enabled and applies a signal on bus 1299 that controls the decoding of the line circuit number stored in network interface register 500. During phase clock T3 gate $\overline{\text{FATS}}$ is enabled and it places the find active time slot command on bus 1299. This command is decoded by decoder 600 of the network controller of FIGS. 6 and 10.

To set the stage for the generation of the EN0 output by the fast audit control shift register 14A1, it will be recalled that flip-flops CFFF and MNUP have been set by the operation of the circuitry of FIGS. 13 and 13A. Before flip-flops MNUP and CFFF were set, as has just been described, their Q outputs apply low signals to gate MNCF maintaining the output of gate MNCF in the high signal state at the end of the previous fast audit cycle. This output, inverted by gate MNCFI, presented a low signal input to the LD terminal of the fast audit control shift register 14A1 loading that register at its input A0 with battery (="1") and its inputs A1 through A6 with ground (="0") signals prior to the onset of the present audit such that Q0 is enabled (set to "1") and all other outputs Q1 through Q6 are set to "0".

When both flip-flops MNUP and CFFF are set during the present audit NAND gate MNCF is enabled and its output, inverted by gate MNCFI, partially enables NAND gates ENON through EN6N. These gates will be fully enabled in succession by the Q0 through Q6 outputs of fast audit control shift register 14A1. The state of shift register 14A1 is advanced by the application of a signal to its toggle input T. This occurs each time a reply signal is returned on system bus 1299 by gates PB4 or PB3 of the network controller of FIG. 10. Gates EN0N through EN6N are temporarily inhibited by the $\overline{Q}$ output of flip-flop WAIT which output remains low during the interval between the issuance of a network time slot command and the return of the network operation complete signal by gates PB3 or PB4.

Accordingly, at the onset of the operations shown in FIG. 14, audit control shift register 14A1 is permitted to energize lead EN0 FIG. 14A which enables gates $\overline{\text{TNIR}}$, $\overline{\text{MKLC}}$ and $\overline{\text{FATS}}$ FIG. 14B, as previously mentioned. When $\overline{\text{FATS}}$ gate 1408 is enabled to place the find active time slot command on bus 1299 via the code generating gates of FIG. 14C this command is forwarded through the sequencer 1120 of FIG. 11 to bus 1290 and thence to the decoder 600 of the network controller, FIG. 6. Decoder 600 energizes lead PFATS to initiate the previously described sequence of operations in the network controller of FIGS. 6 and 10 which result in the network time slot number actually assigned to the active line being entered in time slot register 605 and returned to the main controller 1200, FIG. 12, via bus 1299. Main controller 1200 temporarily stores the time slot number so returned in one of its data storage registers 1230. If the time slot assigned to the active line is valid, i.e., as indicated by the fact that one and only one time slot number is entered into time slot register 605, network controller gate PB3 of FIG. 10 will be enabled as previously described and will apply a signal to bus 1299 which will result in flip-flop 1409 of FIG. 14A being set. Flip-flop 1409 is a D-toggle flip-flop which is toggled by the concurrence of the network operation complete signal and the Q0 output of audit control shift register 14A1.

If flip-flop 1409 is toggled to the line time slot valid state, its output lead LVALID partially enables the eight gates TLTS, MKSC, FATS2, TSTS, CLTS, 1414, 1415-3 and LDTS in FIG. 14B. If, however, the network controller of FIG. 10 determines that the time slot assigned the active line was invalid, the D-toggle flip-flop 1409 is toggled to the reset state by gate PB4 (FIG. 10) and partially enables the six gates CLTS2, FITS, LDTS2, MKSC2, CLTS3, and LDTS3 in FIG. 14B.

The return of the network operation complete signal toggles the audit control shift register to advance its output energization to output Q1 enabling gate EN1N as soon as flip-flop WAIT is reset. The enabling of gate EN1N places a high signal on lead EN1 allowing gates TLTS, MKSC and FATS2 to be enabled on phase clocks T1, T2, and T3, respectively, if the line time slot valid flip-flop 1409 was set during EN0 or enabling gate CLTS2 on phase clock T1 if the line time slot valid flip-flop 1409 was reset.

Assuming that the line time slot valid flip-flop 1409 was set, the successive enabling of gates TLTS, MKSC, and FATS2 transfers transfer the line time slot number (that was put into network interface register 500 by network controller register 605) to the station number byte of the activity register of data storage registers 1230 of the main controller of FIG. 12. When gate MKSC is enabled it issues a command for the decoder associated with interface register 500 of FIG. 5 and for the decoders 301, 302 of the station centerboard to decode the number in the station number register of interface register 500 so that the station port corresponding to this station number may be addressed. As previously described, the addressed station port circuit signals the network controller of FIGS. 6 and 10 over lead SSBI when the circuitry bit in its port shift register arrives at the shift register output thereby defining the time slot actually assigned to the port. When gate FATS2 is enabled it places the find active time slot command on system bus 1299 which is received by decoder 600 of the network controller FIG. 6 to enable it to read its time slot counter 601 when the time slot signal appears on lead SBI. When the network controller of FIGS. 6 and 10 receives the station time slot number assigned to the station, it will be entered in register 605 and gate PB3 will respond if the station time slot is determined by the network controller to be valid while gate PB4 will respond if the station time slot is determined to be invalid.

The network response signals provided by gates PB3, PB4 now toggle the fast audit control shift register 14A1 to energize its output Q2. As soon as the WAIT flip-flop has been reset, gate EN2N will enabled to place a high signal on lead EN2.

The energization of lead EN2 enables gate TSTS during phase clock T1 if the station time slot number was valid and enables gate CLTS if the station time slot number was invalid. Also during the interval when lead EN2 is energized, gate FITS will be energized if the line time slot flip-flop 1409 was reset because the line time slot was not valid.

If gate TSTS is energized, both line and station time slots were found to be valid and the station time slot number received in the network interface register from network controller time slot register 605 is transferred to the station-in-control byte of data storage registers 1230 in the main controller, FIG. 12. Then, during phase clock T2, gate 1414 will be enabled and its output will activate leads RESETMNUP and SETLRUP to indicate the end of the fast audit.

On the other hand, if the station time slot valid flip-flop 1413 had been toggled to the reset state, gate CLTS, 1415-1, would be enabled during phase clock T1 of EN2 and it would issue the clear time slot command over bus 1299 to the network controller to clear the port shift register of the station. The network response signal then toggles the fast audit control shift register 14A1 and its Q3 output is now energized resulting in the energization of lead EN3. When lead EN3 is energized, gate LDTS, 1415-2, is energized if the time slot valid flip-flop 1409 is set but the station time slot valid flip-flop was reset. Enabling of gate LDTS causes the valid line time slot number to be loaded into the port shift register of the station circuit so that the station circuit will be assigned the same valid time slot as has been ascertained was assigned to the line port. On the other hand, if the line time slot valid flip-flop 1409 was reset, gate LDTS2 will be activated when lead EN3 is energized. Activation of gate LDTS2 loads the new idle time slot number (that was found as the result of the operation of gate FITS during the energization of lead EN2) into the port shift register of the line circuit.

The network response now toggles the fast audit shift register to energize its output Q4 which in turn results in the energization of lead EN4. Gate MKSC2 is energized if the line time slot valid flip-flop was reset. Energization of gate MKSC2 causes the decoders associated with interface register 500 and decoders 301 and 302, FIG. 3, associated with the station circuit to be activated to decode the number of the station circuit that was associated with the line having an invalid time slot number. During phase clock T2, gate CLTS3 will be energized to clear the port shift register of the station circuit addressed by the operation of gate MKSC2.

If the line time slot valid flip-flop 1409 was set but station time slot valid flip-flop was reset, gate 1415-3 is enabled during phase clock T5 and leads RESETMNUP and SETLRUP are both set.

The network response now toggles the fast audit shift register 14A1 to energize its output Q5 which results in the energization of lead EN5. The energization of lead EN5 activates gate LDTS3 which causes the new time slot number ascertained by the operation of gate FITS during the preceding energization of lead EN2 to be loaded into the port shift register of the station circuit addressed by the energization of gate MKSC2.

The network response now toggles the fast audit control shift register 14A1 to energize its output Q6 which in turn results in the energization of lead EN6. The energization of lead EN6 fully enables gate SLRUP whose output energizes leads SETLRUP and RESETMNUP which ends the fast audit operations.

Figure 15B:
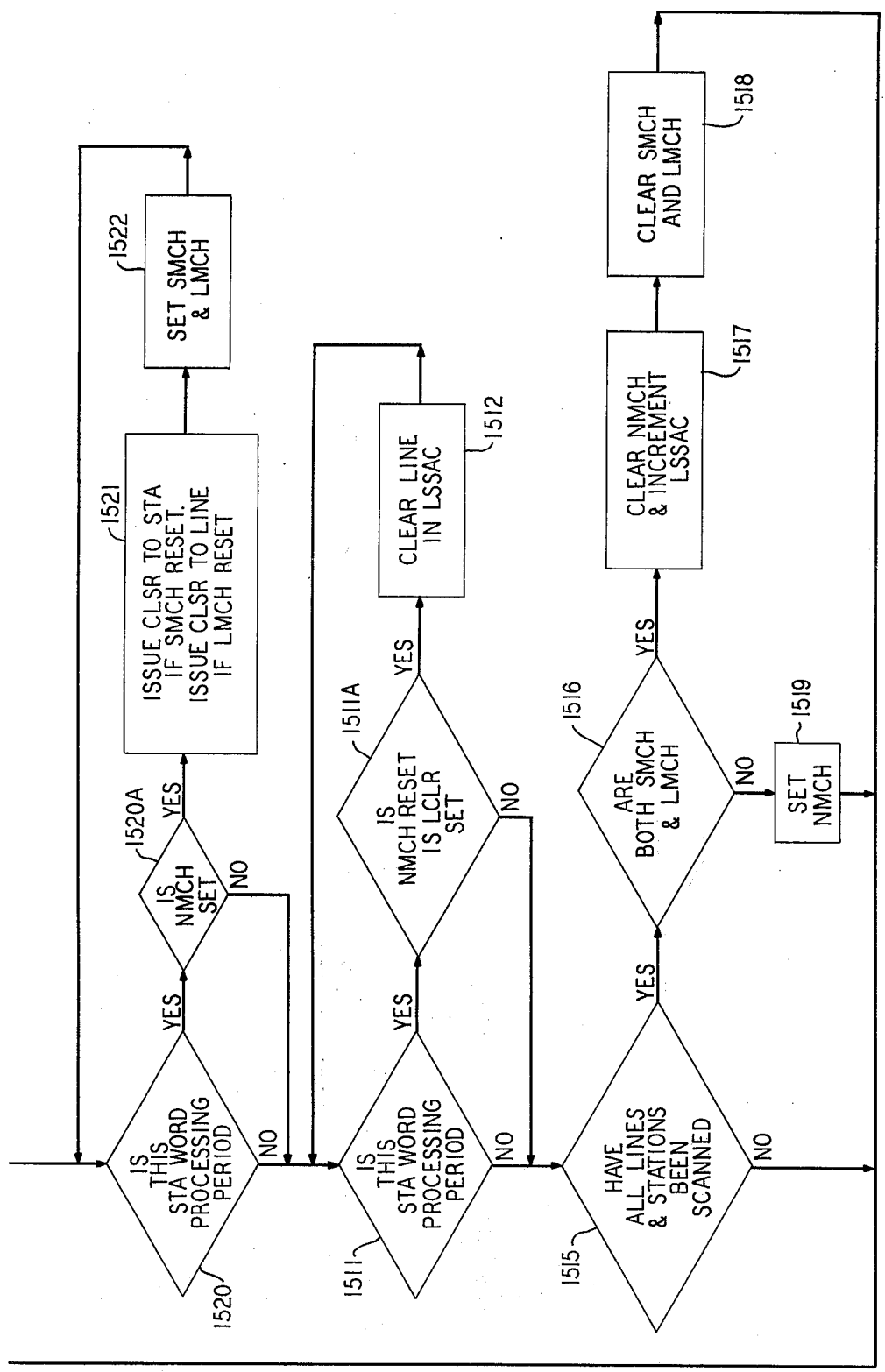

Slot Network Audit (FIGS. 15A and 15B)

Network connections are also audited on a sequential counting basis. During each 25-millisecond interval one idle station or line may be cleared in the network. A counter denominated the line and station slow audit counter LSSAC sequentially counts the number of each line and station having a network appearance. When the number in the slow audit counter matches the number of a line or station being processed and the station is not connected or the line is idle, the slow audit logic generates a CLSR command to zero the respective port shift register. Slow audit is thus a clock on system performance and also takes care of the possibility that noise impulses may have erroneously caused time slot bits to appear in a port shift register.

Referring now to FIG. 15 logic 1501 detects the occurrence of the active line processing period and activates logic 1502 which attempts to match the number of the station having the active line being processed with the number in line or station slow audit counter LSSAC. If logic 1502 obtains a match logic 1504 tests whether the station is on-hook or idle and if so loads logic 1504 with a flag for station disconnect during memory and network update. Logic 1505 is next actuated to set station number match flip-flop SMCH.

During the button processing interval, logic 1506 activates logic 1507 to test whether the number of the line corresponding to the button being processed matches the number in line or station slow audit counter LSSAC. If the numbers match, logic 1508 tests whether the line or service activity byte LSAB in activity memory 1101 indicates that the line is busy. If the activity memory indicates that the line is legitimately in use the line match flip-flop LMCH is set by logic 1509. If the activity memory indicates that the line is idle, logic 1508 sets the line-clear flip-flop and then logic 1509 is activated to set the line-match flip-flop LMCH.

Referring now to FIG. 15B, logic 1520 detects the occurrence of the station word processing period and, assuming that no-match flip-flop NMCH has not been set and the line-clear flip-flop has been set (by logic 1510 in FIG. 15A), logic 1512 is enabled to clear from the network the line whose number is in the line and station slow audit counter LSSAC.

Logic 1515 is activated after all the lines and stations have been scanned. Logic 1516 tests whether both the station match flip-flop SMCH, as well as the line-match LMCH, have been set. If both have not been set, logic 1519 sets no-match flip-flop NMCH. Setting of the no-match flip-flop will be detected by logic 1520A during the station word processing period. Depending upon which of flip-flops SMCH and LMCH are reset, logic 1521 will issue the clear shift register command CLSR to either the station port or line port shift register and will then set both the station match and line match flip-flops via logic 1522. If logic 1516 detects that both the station match and line match flip-flops are set, logic 1517 is activated to clear no-match flip-flop NMCH and to increment the number in the line and station slow audit counter to the number of the next sequential line or station in the system. Thereafter, logic 1518 clears the station and line match flip-flops and the system is ready to audit another station or line.

Figure 15C:
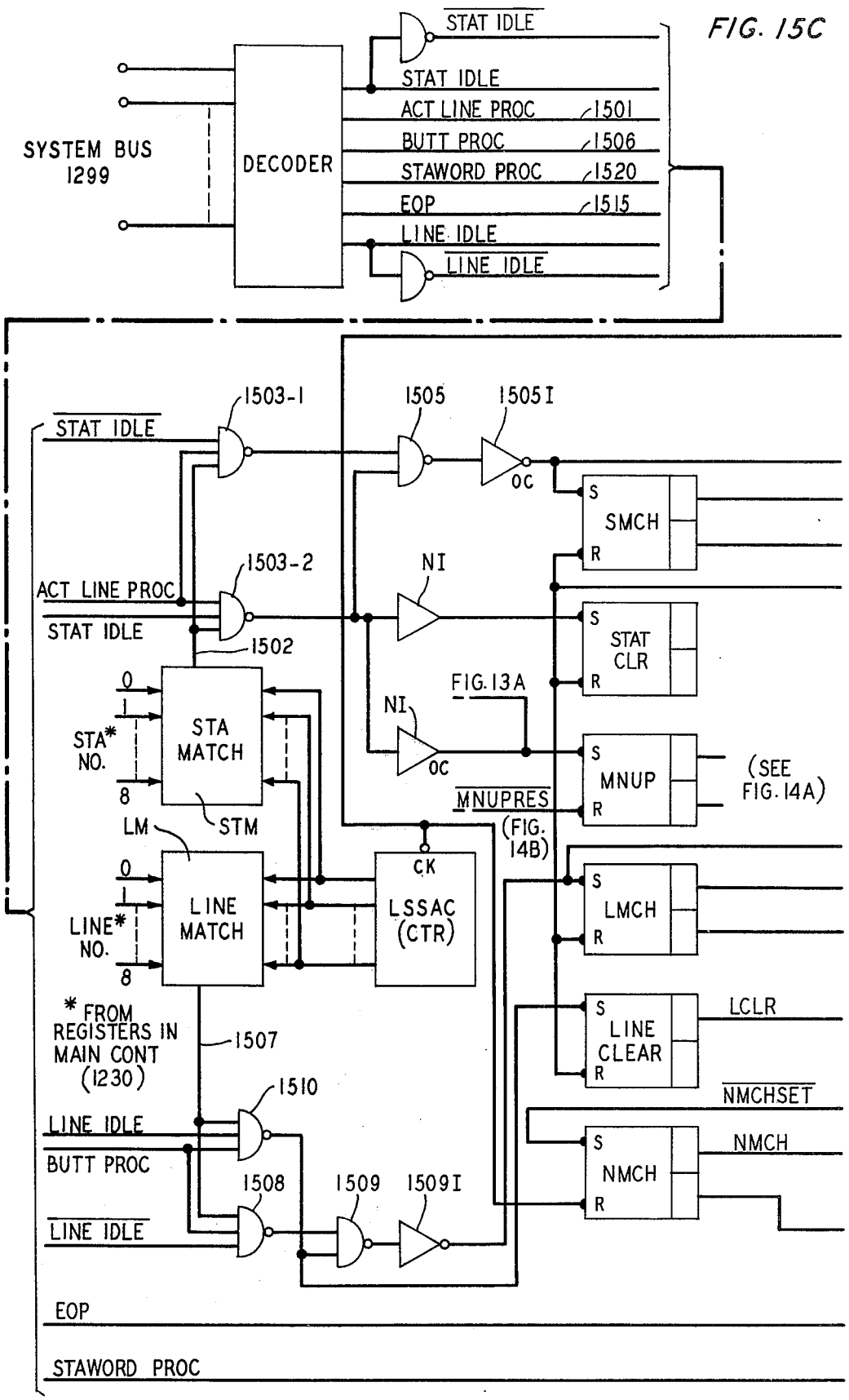
FIGS. 15C and 15D show that portion of the detailed circuitry of memory update and network control 1280 which implements the slow audit process of the present invention.
Figure 15D:
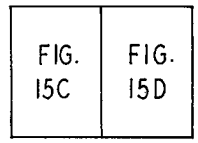
Figure 15D:
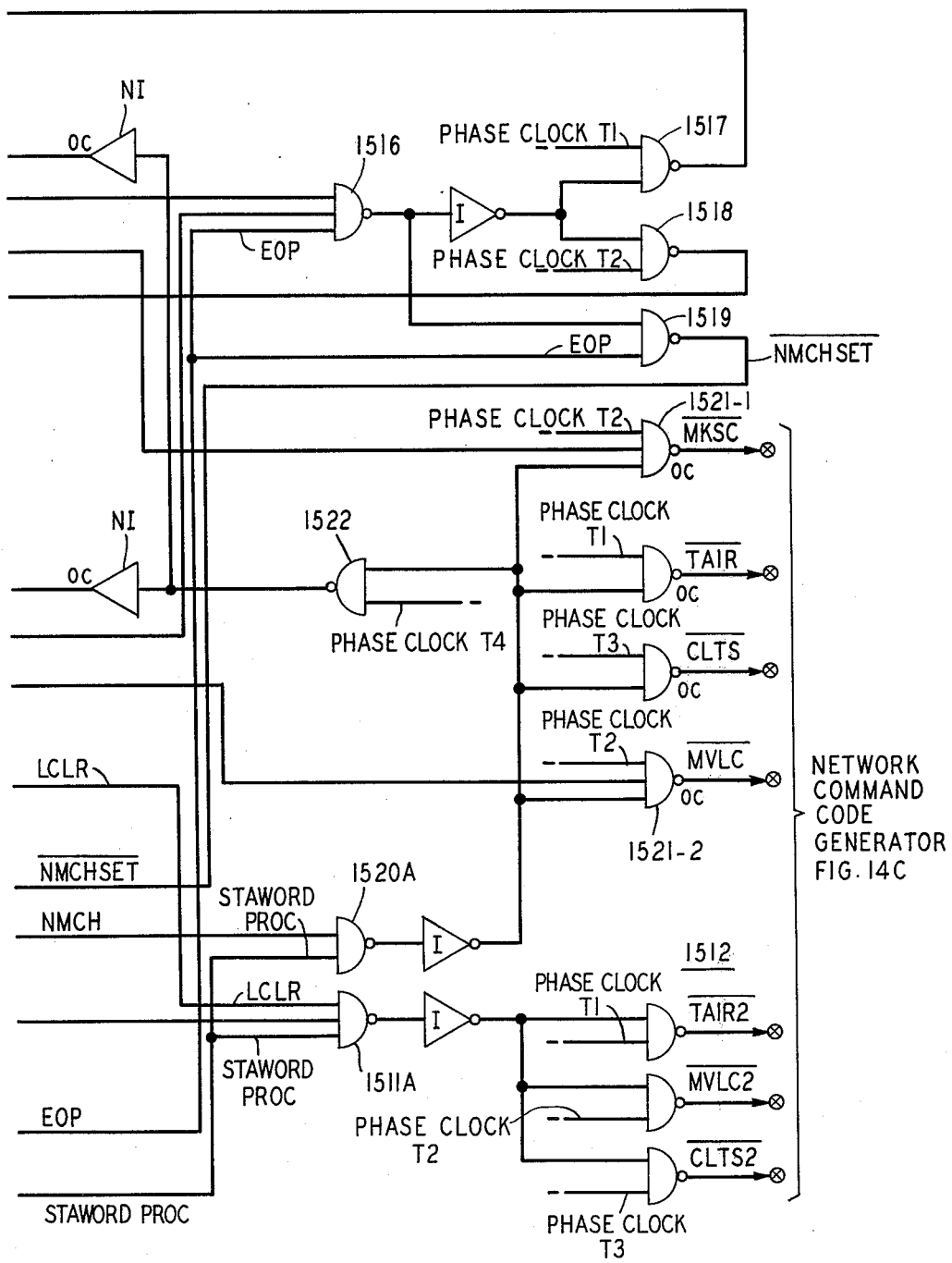

The foregoingly described operations of FIGS. 15A and 15B may be more clearly understood by referring now to FIGS. 15C and 15D which show the detailed connections of the gates and other circuitry of the memory update and network controll 1280 (FIG. 12) which are involved when the apparatus of FIGS. 15A and 15B operates to perform the slow network audit. The circuit elements of FIGS. 15C and 15D have been numbered to correspond to the numbering scheme employed in FIGS. 15A and 15B.

The slow audit sequentially audits each idle station and line in the system. For this purpose, the line and station slow audit counter LSSAC shown in FIG. 15C (and also in FIG. 12) is incrementted each time a line or a station is audited to indicate the number of the next line or station to undergo the slow audit. The right-hand inputs of station number match circuit STM and a line number match circuit LM are connected to the output of counter LSSAC. The left-hand inputs of circuit STM are connected to the station number register of data storage registers 1230, FIG. 12. The left hand inputs of line match circuit LM are connected to the line number register of data storage registers 1230.

When decoder 1501 detects the code for the active line processing period on system bus 1299, gates 1503-1 and 1503-2 are partially enabled. When station match circuit STM detects that the station being processed matches the contents of counter LSSAC, lead 1502 is energized to further partially enable gates 1503-1 and 1503-2. Gate 1503-1 will be fully enabled if the station being processed is off-hook, (SSB = $\overline{STAT}$ $\overline{IDLE}$). When gate 1503-1 is so enabled, it produces a low signal to the upper input of NAND gate 1505 causing its output to go high. The output of gate 1505 is inverted by inverter 1505I and applied as a low signal to the set input of station match flip-flop SMCH (also shown in FIG. 12). This sets flip-flop SMCH.

On the other hand, if the station being processed was idle, gate 1503-2 would be enabled and it in turn would apply a low signal to the input gate 1505 which would set flip-flop SMCH as before. However, in addition the low signal output of gate 1503-2 would be applied through noninverting isolating amplifiers to the set input of flip-flops STATCLR and MNUP. (Flip-flop MNUP is here shown redundantly for the sake of convenience. It is shown also in FIG. 14A). The setting of station match flip-flop SMCH indicates that the station whose number was registered in the LSSAC has been found. The setting of station clear flip-flop STATCLR causes the station clear command to be put on bus 1299 to clear the station port shift register during the memory update and network control cycle MNUP previously described.

Decoder 1506 detects the code for the button processing period on system bus 1299 and partially enables gates 1508 and 1510. When the line number in the line number register of registers 1230 matches the number to which counter LSSAC has been incremented, lead 1507 is energized by line match circuit LM thereby further partially enabling gates 1508 and 1510. Gate 1510 will be fully enabled if the line is idle while gate 1508 will be fully enabled if the line is active. Either of gates 1508 or 1510 being enabled causes gate 1509 to develop a high output signal which is inverted by inverter 1509I and is applied as a low signal to the set input of line match flip-flop LMCH, setting this flip-flop. If gate 1510 is enabled, the low signal at its output is applied to the set input of line clear flip-flop LCLR, setting this flip-flop.

The setting of the line match flip-flop LMCH indicates that the line whose number was registered in the line and station slow audit counter LSSAC has been found. The setting of the line clear flip-flop LCLR issues the order to clear the port shift register for the line.

Decoder 1520 detects the code for the station word processing period when it appears on bus 1299 and partially enables Gates 1520A and 1511A, FIG. 15D. Gate 1520A will be fully enabled if the no-match flip-flop NMCH has been set in which case its Q output will provide a high signal to the lowermost input of NAND gate 1520A. When gate 1520A is fully enabled it applies a low signal which is inverted and appears as a high signal at the lowermost inputs of NAND gates $\overline{MKSC}$, $\overline{TAIR}$, $\overline{CLTS}$, $\overline{MKLC}$, and gate 1522 partially enabling all of these gates. Of these gates, gate $\overline{\text{TAIR}}$ will be fully enabled during phase clock T1. Enabling of gate $\overline{\text{TAIR}}$ causes the number in the line and station show audit counter LSSAC to be transferred to the network interface register 500, FIG. 5. During phase clock T2, gate 1521-1 will be enabled if flip-flop SMCH has been reset. Gate 1521-1 when so enabled issues the command $\overline{\text{MKSC}}$ that causes the decoders associated with the network interface register, FIG. 5, and the decoders 301 and 302 associated with the station ports to decode the station circuit number stored in the network interface register 500 thereby to address the indicated station port circuits of FIGS. 1 and 2. During phase clock T2, gate 1512-2 will be fully activated if the line match flip-flop LMCH is reset. When gate 1521-2 is fully activated, it issues the $\overline{\text{MKLC}}$ command. This command causes the line circuit number stored in network interface register 500 to be decoded by the decoders 801 and 802, FIG. 8, which serve the line port circuits of FIGS. 7 and 9 to address the line port corresponding to the line number.

During phase clock T3, gate $\overline{\text{CLTS}}$ will be energized. The energization of gates $\overline{\text{CLTS}}$ causes the shift register in the line or station port circuits so addressed to be cleared of the time slot. During clock phase T4, gate 1522 will be fully energized. The energization of gate 1522 causes line match flip-flop LMCH and station match flip-flop SMCH to be set.

Also, during the station work processing period NAND gate 1511A will be fully enabled if the no-match flip-flop NMCH remains reset and the line clear flip-flop LCLR had been set. (See the above description pertaining to NAND gate 1510 for an explanation of how the line clear flip-flop LCLR is set.) The full enabling of NAND gate 1511A produces a low signal which is inverted and applied as a high signal to he upper inputs of NAND gates $\overline{\text{TAIR2}}$, $\overline{\text{MKLC2}}$, and $\overline{\text{CLTS2}}$. These NAND gates are successively enabled on phase clocks T1, T2, and T3 to generate the transfer slow audit number from the LSSAC to the network interface register (during clock phase T1), decode the line circuit number stored in network interface register operation (during clock phase T2), and the clear operation (during clock phase T3) in a manner similar to that just described.

Decoder 1515 detects the code for end of processing when it appears on system bus 1299. Decoder 1515 fully enables gate 1516 if flip-flops SMCH and LMCH had both been priorly set. The full enabling of gate 1516 produces a low signal which is inverted and applied as a high signal to gates 1517 and 1518. Gate 1517 will by fully enabled on clock phase T1 and when so enabled will increment the line and station slow audit counter LSSAC to the next line or station number as the case may be and will reset the no-match flip-flop NMCH. Gate 1518 will be fully enabled on phase clock T2 to reset each of flip-flops SMCH, CLR, LMCH and line clear LCLR. On the other hand, if gate 1516 was not fully enabled by the set condition of both flip-flops SMCH and MNUP, the low signal from the Q output of either of these gates would cause gate 1516 to apply a high output to the upper input of gate 1519. Gate 1519 would then be fully enabled by the output of decoder 1515 to set the no-match flip-flop NMCH. Accordingly, the setting of flip-flop NMCH indicates that either the line or station match flip-flops LMCH or SMCH has remained reset because no match has been found between the number in the line and station slow audit counter LSSAR and the number in the line or station match register LMR or STMR. During the next station word processing period, the set condition of the NMCH flip-flop will cause gate 1520A to be enabled and the functions previously described as being performed by this gate will be executed. The purposes of clearing lines and stations having no appearance in the memory of the system is that the network may be equipped with line and trunk port circuits which have not yet been assigned in the service assignment memory. These ports should be cleared so that their port circuit shift register will not have spurious time slot bits circulating therein thereby depriving assigned ports of the possibility of using these time slots.

Other Time Slot Commands

In addition to the foregoing described timed slot commands, the main controller via sequencer 1120 may also issue a clear total time slot command, CTTS. This command is for the purpose of clearing a time slot from a plurality of port circuit shift registers after a number of ports have been assigned the same time slot as, for example, during a conference connection. All of the ports assigned this number may be cleared without the necessity of separately accessing each of the ports involved in the connection. When CTTS command is issued lead CTTS at the output of decoder 600 is energized. Simultaneously, the 7-bit time slot number is supplied to match circuit 602 by the main controller. Time slot counter 601 counts clock pulses delivered on lead CLK. When time slot counter 601 begins a new cycle of time slots, gate PBCYLI sets the flip-flop comprising gates PBCDE1 and PBCDE0. The setting of this flip-flop energizes lead PBCDE for priming logic circuit 607. When time slot counter 601 arrives at the time slot number stored in match circuit 602, match circuit 602 energizes lead PTSMTCH. The simultaneous energization of lead PTSMTCH and CTTS activates gate PCTTS. The activation of gate PCTTS enables logic circuit 607 to apply a "0" signal to the station port mark and write buses MS and WS and to the line port mark and write buses ML and WL. The "0" signal causes the time slot recorded in the port time slot shift register(s) to be erased, as will now be more particularly explained.

Responsive to the activation of gate PCTTS and lead PBCDE, circuit 607 will apply a "0" signal to the aforementioned station and line port mark and write leads. Interface register 500, not having received a station or line number from sequencer 1120, will apply "0" select signals to the station and line centerboard circuits and the decoders in the centerboard circuits will accordingly apply "0" signals to the station port select leads SPS- and SBS-(see FIG. 2) and to the line port select leads LPS- and LBS-leads (see FIG. 7) of the station and line port circuits, respectively. Accordingly, the line and station port circuits will receive "0" signals on their respective MARK, WRITE and "SELECT" leads responsive to which a "0" bit will be written into the port shift register. Referring, for example, to station port circuit 3 of FIG. 2, low signals appearing on the MARK and WRITE leads will activate NOR gate MW to apply a high signal to the upper-most input of NOR gate SRD. Gate SW receives "0" signals on its WRITE and SELECT inputs and it too applies a high signal to an input of gate SRD. Gate SM receives low input signals from the MARK and SELECT leads and applies a high signal to the lower input of shift register feedback gate SRFB. The high signal is applied to the lower input signal to gate SRF regardless of the state of the output of shift register 301. Accordingly, only one input of gate SRD is in the low signal condition and the output of gate SRD accordingly applies a low input to shift register 301. Thus, with the MARK and SELECT leads low, feedback of the shift register output to input is prevented. Accordingly, it is an aspect of the CCTS command that all ports having the time slot registered in time slot shift register 605 will be cleared of this time slot without requiring the ports to be individually accessed by loading their port number into interface register 500.

In addition to the foregoing commands, the main controller, via sequencer 1120 and cable 1290, may issue a selective clear time slot command CLTS. The CLTS command is similar to the CTTS command except that it is limited in scope to clear a specific time slot and only from a selected port circuit whereas the CTTS command clears a specific time slot from all port circuits having that time slot assigned. The CLTS command may be issued to clear a specific time slot in a port circuit such as a tone port circuit (FIG. 9) whose port shift register 102 would normally have more than one time slot assigned. A tone port circuit is a circuit which is similar to the line circuit of FIG. 7 except that a tone generator is connected between the tip and ring leads instead of a central office connection. The port shift register 102 of a tone port circuit would then have several time slot bits entered therein for supplying tone to different station circuits during different time slots. When the main controller determined that the tone was to be removed from a specific station, the appropriate tone port would be selected and only the specified time slot would be cleared.

What has been described is considered only illustrative of the principles of this invention. Numerous other embodiments can be devised by one skilled in the art without departing from the spirit and scope thereof.

What is claimed is:

1. In a time division switching system having a communications bus, a plurality of station ports and line ports, a central memory for indicating which ports are to be interconnected, and means defining a numbered sequence of time slots during which predetermined ones of said ports may be connected to said communicating bus, the combination comprising
    first common bus means associated with said line ports and second common bus means associated with said station ports,
    addressable means at each said station port and line port to cause the associated one of said common bus means to exhibit a particular signal condition during the time slot that said port is connected to said communications bus,
    means for addressing said addressable means of a station and of a line port which said central memory indicates are to be interconnected,
    means for storing an indication of the time slot numbers accruing when said particular signal condition is present on said first and on said second bus means,
    means for assigning a new time slot number to said station and line port addressed by said addressing means when said time slot numbers accruing are different, and
    means operative when said numbers agree for advancing said addressing means to address another pair of said station and line ports indicated in said memory.

2. In a time division switching system having a plurality of line and station port circuits, a time division network in which communications connections may be estabished among said port circuits during predetermined time slots, a central activity memory for indicating which port circuits for processing interconnections of said port circuits, a method for periodically auditing said interconnections comprising
    obtaining from said activity memory the identity of one of said port circuits indicated in said memory as being interconnected with another of said port circuits,
    accessing said one of said port circuits to ascertain the time slot assigned thereto for one of said network interconnections,
    accessing the other of said port circuits indicated in said activity memory as being interconnected with said one of said port circuits to ascertain the time slot assigned thereto for interconnection in said network, comparing the numbers of said time slots so ascertained, and
    accessing both said port circuits to reassign time slot numbers thereto when said ascertained time slot numbers do not agree.

3. In a time division switching system having a plurality of line and station port circuits, a time division network in which communications connections may be established among said port circuits during predetermined time slots, a central activity memory for indicating which port circuits are to be interconnected, and central control means for processing interconnections of said port circuits, means for periodically auditing said interconnections comprising
    an audit register,
    means for entering in said audit register the identity of one of said station port circuits indicated in said activity memory as being interconnected with one of said line port circuits,
    means controlled by said audit register for accessing said port circuits to ascertain whether each of said port circuit is validly assigned to a time slot,
    means for clearing said accessed port circuits when said accessing means indicates that said accessed port is assigned an invalid time slot,
    means for finding an idle time slot in said time division network, and
    means for assigning said idle time slot to said last-mentioned port circuits.

4. A time division switching system according to claim 3 wherein said means for accessing includes means for ascertaining whether each said accessed port circuit is assigned to more or less than one time slot, and wherein said means for clearing clears said port circuits when said accessing means indicates that either of said port circuits are assigned to more than one time slot and when said accessing indicates that either of said port circuits is not assigned a time slot.

5. A time division switching system according to claim 3 wherein each said port circuit includes a shift register for defining the time slot during which said port circuit is assigned to a communications connection in said network, common bus means connected to each said time slot shift register, and wherein said means for accessing includes means for monitoring said common bus means.

6. In a time division switching system having a plurality of line and station port circuits, a time division network in which communications connections may be established among said port circuits during predetermined time slots, a central activity memory for indicating which port circuits are to be interconnected, and central control means for processing interconnections of said port circuits, means for periodically auditing said interconnections comprising an audit register, means for entering in said audit register the identity of one of said station port circuits indicated in said activity memory as being interconnected with one of said line port circuits, means for accessing said one of said station port circuits to ascertain the time slot number assigned thereto for one of said network interconnections, means for accessing said one of said line port circuits to ascertain the time slot number assigned thereto for one of said network interconnections, means for comparing the numbers of said time slots so ascertained, means for removing said time slot numbers from said port circuits accessed by said accessing means when said comparing means indicates said time slot numbers disagree, means for assigning an idle time slot to said last-mentioned port circuits, and means for incrementing said audit register.

7. In a time division switching system having a plurality of line and station port circuits, a time division network in which communications connections may be established among said port circuits during predetermined time slots, a central activity memory for indicating which port circuits are to be interconnected, central control means for processing interconnections of said port circuits, said central control means being programmed to audit said interconnections according to the following method:

storing in a first counter the number of one of said port circuits, comparing the number of the port circuit being processed by said central control means with the number in said first counter, accessing said activity memory when said comparing indicates said numbers agree to ascertain whether said port being processed is in the active or idle state, flagging said central control means to disconnect port circuits in said network indicated as being in said idle state, incrementing said first counter after said flagging of said idle port circuits and after said accessing ascertains an active state, storing in a second register the number of a port circuit being processed having a communications connection established in said network with another of said port circuits, accessing said network to ascertain the time slot number assigned to said port circuit whose number is in said second register and the time slot number of said another of said port circuits, reassigning a new time slot number to said last-mentioned port circuit and to said another of said port circuits when said network accessing indicates said numbers disagree, and clearing said second register after said reassigning and after said network accessing indicates agreement of said time slot numbers.

8. The method according to claim 7 further including the step of reassigning new time slot numbers to said port circuits involved in said communications connection when said network accessing indicates either of said port circuits is assigned to more than one or to less than one time slot number.

9. In a time division switching system having a plurality of port circuits appearing in a network amongst which communications connections may be established during predetermined time slots, a central control for processing interconnection of said port circuits, and a central activity memory for indicating which port circuits are to be interconnected, the method of auditing the status of said network comprising ascertaining during the processing of each port circuit indicated in said activity memory as having a communications connection established in said network with another of said port circuits whether a valid time slot has been assigned in said network to said port circuit and to said another of said port circuits, ascertaining once during the processing of all of said port circuits whether a predetermined one of said port circuits is in the active or idle state, reassigning a new time slot number to said each and to said another port circuit when said time slot is invalid, and disconnecting said predetermined one of said port circuits when said ascertaining indicates said one of said port circuits is idle.

10. The method according to claim 9 wherein said ascertaining of said time slot validity indicates an invalid time slot when either said each or said another port circuit is assigned to more than on or to less than one time slot.

* * * * *

UNITED STATES PATENT AND TRADEMARK OFFICE
CERTIFICATE OF CORRECTION

PATENT NO. : 3,967,072

DATED : June 29, 1976

INVENTOR(S) : James O. Dimmick, Theras G. Lewis, John F. O'Neill and Lucian G. Fabiano, Jr.

It is certified that error appears in the above-identified patent and that said Letters Patent are hereby corrected as shown below:

In the Specification, Column 4, line 1, "18A" should read --18--; line 24, after "512" the words --stations and 512-- should be inserted; line 35, "summer" should read --summing--; line 38, "offices" should read --office--. Column 6, line 24, "QS'" should read --QS'--; line 27, "QS'" should read --QS'--; line 28, "QS'" should read --QS'; line 36, "OS'" should read --QS'--. Column 7, line 47, "QS'" should read --QS'--. Column 8, lines 60 and 61, "but is not applied to the upper input of gate N," should be deleted. Column 9, line 11, "cross-sectional" should read --cross-connected--. Column 11, line 21, "on" should read --of--. Column 13, line 11, "Q" should read --$\bar{Q}$--. Column 14, line 15, "ilumination" should read --illumination--; line 34, "work" should read --word--; line 57, "work" should read --word--. Column 15, line 13, "work" should read --word--; line 60, "50-millisecond" should not be bold-face type. Column 16, line 19, after "to" the word --the-- should be inserted; line 53, "is" should read --in--. Column 17, line 50, "sate" should read --state--. Column 18, line 31, "bytefor" should read --byte for--. Column 20, line 7, "determinded" should read --determined--; line 46, "in" should read --is--. Column 21, line 10, "stage" should read --state--; line 57, before "FIG. 10" the word --In-- should be inserted; line 68, "busy idle" should read --busy/idle--. Column 22, line 56, "PSVETS" should read --PSEVTS--. Column 23, line 20, "flip-flops" should read --flip-flop--. Column 24, line 55, "1396" should read --1306--. Column 25, line 12, "(Similarly" should read --Similarly--. Column 30, line 38, "Q" should read --$\bar{Q}$--. Column 31, line 35, "circuitry" should read --circulating--; line 53, after "will" the word --be-- should be inserted. Column 32, line 57, "Slot" should read --Slow--. Column 33, line 56, "controll" should read --control--; line 65, "incrementted" should read --incremented--. Column 35, continued on Page 2

UNITED STATES PATENT AND TRADEMARK OFFICE
CERTIFICATE OF CORRECTION

PATENT NO. : 3,967,072

DATED : June 29, 1976

INVENTOR(S) : James O. Dimmick, Theras G. Lewis, John F. O'Neill and Lucian G. Fabiano, Jr.

It is certified that error appears in the above-identified patent and that said Letters Patent are hereby corrected as shown below:

line 36, "he" should read --the--. Column 37, line 3, after "output", the word --bit-- should be inserted. Column 38, line 44, "circuit" should be --circuits--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*